(12) United States Patent
Hayakawa et al.

(10) Patent No.: US 7,349,330 B1
(45) Date of Patent: Mar. 25, 2008

(54) PACKET RECEIVER WITH THE INFLUENCE OF JITTER AND PACKET LOSSES REDUCED BEFORE A BUFFER BECOMES IDLE DUE TO DATA DELAYS AND PACKET RECEIVING METHOD USING THE SAME

(75) Inventors: Shinji Hayakawa, Tokyo (JP); Satoshi Watanabe, Tokyo (JP); Atsushi Shimbo, Tochigi (JP); Hiromi Aoyagi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1426 days.

(21) Appl. No.: 09/703,792

(22) Filed: Nov. 2, 2000

(30) Foreign Application Priority Data

Mar. 27, 2000 (JP) .............................. 2000-085744

(51) Int. Cl.
  *H04L 12/26* (2006.01)
  *H04L 1/00* (2006.01)
(52) U.S. Cl. ...................................... 370/229; 370/230
(58) Field of Classification Search ........ 370/229–232, 370/234, 235, 236.1, 412, 414–418, 428, 370/429, 503, 516, 517, 522, 528, 235.1
  See application file for complete search history.

(56) References Cited

U.S. PATENT DOCUMENTS

| | | | | |
|---|---|---|---|---|
| 4,607,363 A | * | 8/1986 | Platel et al. ................. | 370/230 |
| 4,707,831 A | * | 11/1987 | Weir et al. ................... | 370/416 |
| 4,769,844 A | * | 9/1988 | Fujimoto et al. ............ | 704/248 |
| 4,918,687 A | * | 4/1990 | Bustini et al. ............... | 370/235 |
| 4,993,022 A | * | 2/1991 | Kondo et al. ................ | 370/462 |
| 5,231,633 A | | 7/1993 | Hluchyj et al. | |
| 5,659,541 A | * | 8/1997 | Chan .......................... | 370/236 |
| 5,813,025 A | * | 9/1998 | Murphy et al. ............. | 711/114 |
| 5,914,936 A | * | 6/1999 | Hatono et al. .............. | 370/230 |
| 6,091,709 A | * | 7/2000 | Harrison et al. ............ | 370/235 |
| 6,219,339 B1 | * | 4/2001 | Doshi et al. ................. | 370/235 |
| 6,253,207 B1 | * | 6/2001 | Malek et al. ............. | 707/104.1 |
| 6,389,032 B1 | * | 5/2002 | Cohen ........................ | 370/412 |
| 6,442,166 B1 | * | 8/2002 | McDonald et al. .... | 370/395.42 |

(Continued)

FOREIGN PATENT DOCUMENTS

JP 1029141 1/1989

(Continued)

*Primary Examiner*—Edan Orgad
*Assistant Examiner*—Chuong Ho
(74) *Attorney, Agent, or Firm*—Rabin & Berdo, P.C.

(57) ABSTRACT

A packet receiver includes a packet memory circuit for temporarily storing received packets in a FIFO (First-In First-Out) fashion in the form of a queue. A read start threshold setting circuit sets, with respect to the length of the queue, a read start threshold at which the received packets should begin to be read out. A read comparing circuit determines whether or not the length of the queue has reached the read start threshold, and outputs a read command signal in accordance with the result of decision. In response to the read command signal, a read control circuit causes the received packets to be read out of the packet memory circuit. The packet receiver reduces the influence of the jitter of a communication network on speech quality. Also, the packet receiver reduces the influence of delays of packets by executing discard processing with the queue.

13 Claims, 15 Drawing Sheets

U.S. PATENT DOCUMENTS 6,473,432 B1 * 10/2002 Nishimura et al. ......... 370/412
6,658,027 B1 * 12/2003 Kramer et al. .............. 370/516
7,006,435 B1 * 2/2006 Davies et al. ............... 370/230

FOREIGN PATENT DOCUMENTS

| | | |
|---|---|---|
| JP | 1175432 | 7/1989 |
| JP | 5-502776 | 5/1993 |
| JP | 7-306697 | 11/1995 |
| JP | 7-334191 | 12/1995 |
| JP | 10-285213 | 10/1998 |
| JP | 11215182 | 8/1999 |

* cited by examiner

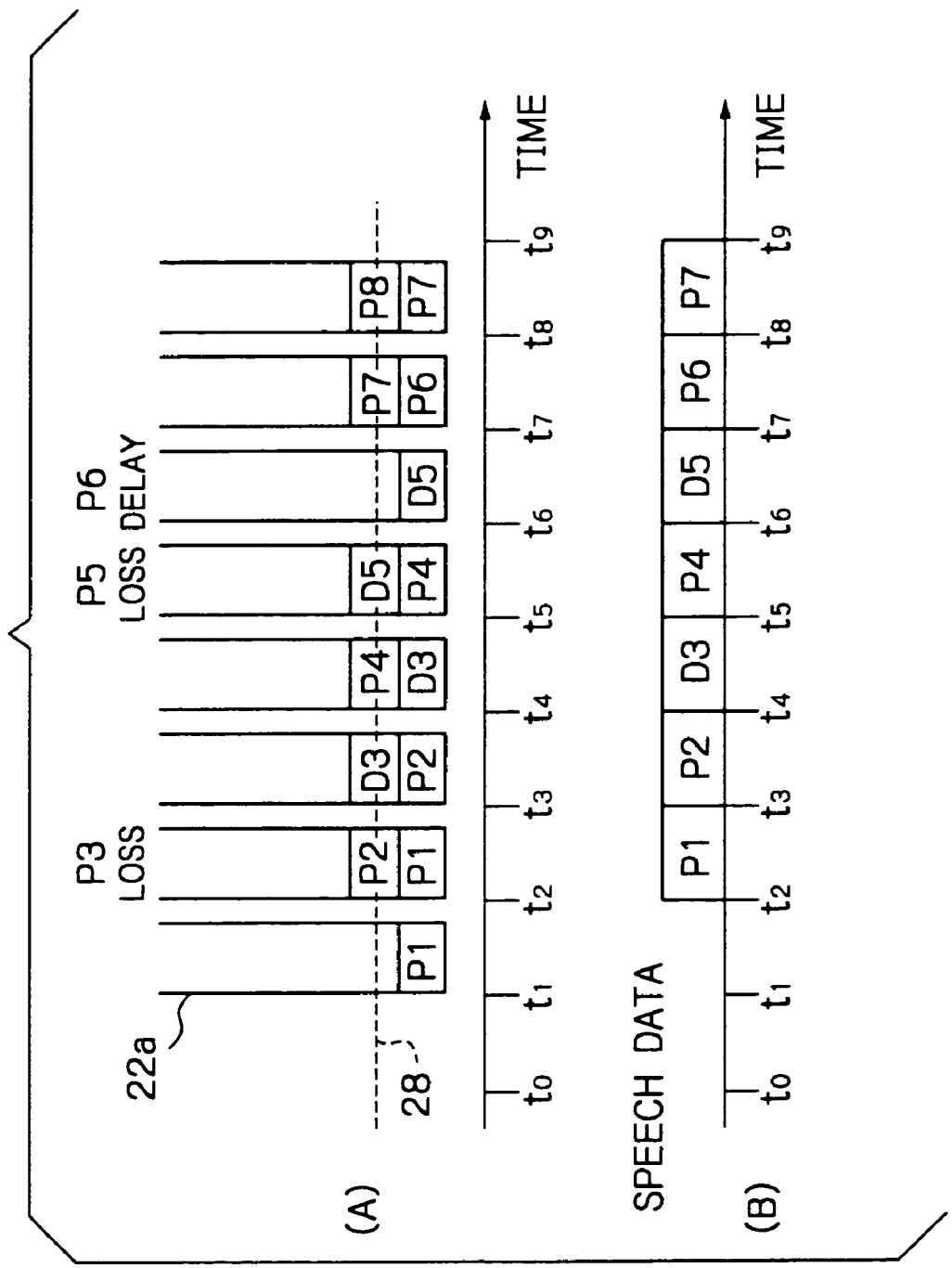

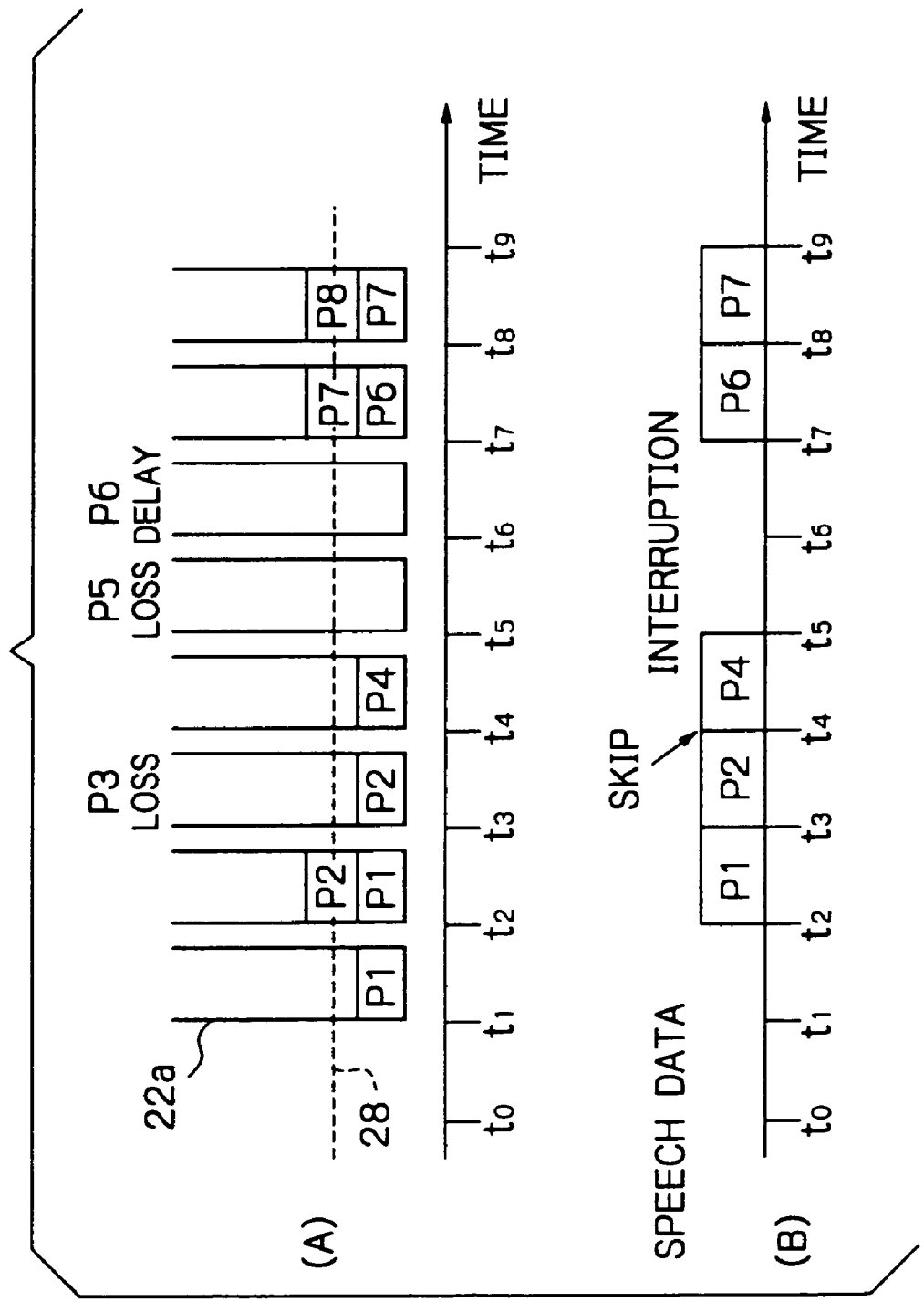

PACKET RECEIVER WITH THE INFLUENCE OF JITTER AND PACKET LOSSES REDUCED BEFORE A BUFFER BECOMES IDLE DUE TO DATA DELAYS AND PACKET RECEIVING METHOD USING THE SAME

BACKGROUND OF THE INVENTION

1. Field of the Invention

The present invention relates to a packet receiver advantageously applicable to a speech transmission and receipt system of the type sending a speech signal in the form of packets and decoding the packets to thereby reproduce the original speech signal, and a packet receiving method using the same.

2. Description of the Background Art

In a speech transmission and receipt system of the type transferring packets, a packet transmitter digitizes a speech signal input thereto, temporarily stores the resulting speech data, and sequentially codes the speech data frame by frame. Further, the packet transmitter packetizes the frame-by-frame coded speech data. Specifically, the packet transmitter generally stores the coded speech data until they reach a preselected amount, and then adds header information to the speech data of each frame to thereby packetize the speech data. The packetized speech data are sent to a packet receiver via a communication network.

The packet receiver temporarily stores the packets received from the packet transmitter and executes a procedure inverse to the procedure of the packet transmitter. Specifically, the packet receiver depacketizes the packet data, decodes the resulting data on a frame basis to thereby produce speech data, and transforms the decoded data to an analog speech signal.

So long as packet transmission conditions are ideal, the packets are sent without any loss and implement ideal speech communication free from the interruption or the skip of a speech. The interruption and the skip of a speech respectively refer to intermittent interruptions occurring in a speech output from the packet receiver and a continuous loss of the speech that makes the speech hard to follow.

However, ideal packet transmission stated above is rarely achievable for the following reasons. Traffic on a packet communication network varies every moment because a number of users access the network at the same time. Actual packet communication is dependent on the variation of the traffic, so that the transmission time of the network is not constant. As a result, some of the packets sent from the packet transmitter arrive at the packet receiver with delays. In the worst case, some packets are practically lost while being transferred via the network. The delays cause the intervals between consecutive packets received by the packet receiver to vary, i.e., bring about jitter. Consequently, packets expected to arrive at the packet receiver are lost, resulting in the interruption of a speech. When a packet or a frame is lost, an error frame may be generated on the basis of frame data immediately preceding the above frame in order to maintain the continuity of sound. Even this kind of scheme, however, cannot prevent the quality of reproduced sound from being degraded.

The delay of a received packet makes, e.g., a buffer included in the packet receiver idle for a moment. Such delays sequentially accumulate and appear as delays from preselected times for reproduction during processing following data read-out. Let the idle state of the buffer ascribable to the accumulation of delays be referred to as an idle buffer state occurring when a read request is generated, in distinction from usual idle states occurring at preselected intervals between preselected data reading times. The above idle buffer state interrupts a speech and aggravates the delay.

Beside the packet delay, a speech packet and therefore speech data is lost in the worst case, resulting in the skip of a speech. The skip, however, saves time and thereby cancels the delay accordingly.

Japanese patent laid-open publication Nos. 306697/1995 and 334191/1995 (Prior Art Documents 1 and 2 hereinafter, respectively), for example, teach measures against jitter. Japanese patent laid-open publication No. 285213/1998 (Prior Art Document 3 hereinafter), for example, proposes measures against jitter and packet losses.

Specifically, Prior Art Document 1 includes a step of picking up only reproducible frames out of received packets, which are to be discarded, between processing for temporarily storing received packets and processing for decoding data. For this purpose, reproduced frames or frame numbers attached to the frames are continuously counted up to the end of packet communication. This, however, results in an enormous count when packet communication is held over a long period of time, and therefore needs an exclusive calculator and a storage capable of storing an enormous numerical value. Prior Art Document 1 therefore increases the system cost to a noticeable degree.

Prior Art Document 2 copes with jitter by executing time domain compression between decoding and temporary speech data storage. Specifically, after the decoding of received packets, time domain compression is executed in such a manner as to cancel soundless portions ascribable to packet delays. The time domain compression, however, requires a prohibitive amount of calculations and extremely high calculation performance. Moreover, Prior Art Document 2 stores a packet delay or idle state and executes time domain compression, which corresponds to the delay, with speech data derived from the following received packet. This procedure involves the storage of a delay and calculations for allotting compression ratios to speech data. Consequently, Prior Art Document 2 critically increases the cost of the packet receiver and is apt to further increase the amount of calculations.

The measure taught in Prior Art Document 3 against jitter and packet losses causes a packet transmitter to code and send only sound portions and causes a packet receiver to feed a single dummy packet for decoding when a packet delay or a packet loss occurs. Specifically, decoding is effected with a single dummy frame without waiting for the arrival of the next packet at the packet receiver. A packet arrived at the packet receiver while decoding is under way is dealt with as a processed packet and discarded in order to obviate a delay. A problem with Prior Art Document 3 is that the insertion ratio varies over a broad range in dependence on the capacity of a receipt buffer for storing received packets. For example, when the capacity of a receipt buffer is reduced to reduce the initial delay, many of received packets are delayed and increase the insertion ratio of the dummy packet, critically lowering the quality of a reproduced speech. Moreover, Prior Art Document 3 does not show or describe how the capacity of a receipt buffer is determined specifically. The measure taught in Prior Art Document 3 appears to be difficult to practice without resorting to the prohibitive repetition of a trial and error procedure.

SUMMARY OF THE INVENTION

It is therefore an object of the present invention to provide a packet receiver capable of reproducing high quality data from packets without repeating a trial and error procedure against jitter and packet losses, and a packing receiving method using the same.

In accordance with the present invention, a packet receiver connected to a network for receiving communication packets sent from a packet transmitter and containing coded speech data via the network, decoding the packets and outputting decoded speech data includes a packet memory circuit for temporarily storing received packets including the communication packets in a FIFO (First-In First-Out) fashion to thereby form a queue. A read start threshold setting circuit sets, with respect to the length of the queue, a read start threshold at which the received packets should begin to be read out. A read comparing circuit determines whether or not the length of the queue has reached the read start threshold, and outputs a read command sianal in accordance with the result of the decision. In response to the read command signal, a read control circuit causes the received packets to be read out of the packet memory circuit.

Also, in accordance with the present invention, a packet receiving method for receiving communication packets sent from a packet transmitter via a communication network and containing coded speech data via the network, decoding the communication packet begins with a first step of setting, before temporarily storing received packets including the communication packets to thereby form a queue, a read start threshold at which the received packets should begin to be read out, a discard start threshold at which they should begin to be discarded, and a discard end threshold at which they should end to be discarded with respect to the length of said queue. In a second step, the received packets are temporarily stored to thereby form the queue. In a third step, the queue and the read start threshold are compared to each other in order to output, in accordance with the result of the comparison, a read command signal for reading out the received packets. In a fourth step, the received packets are read out in response to the read command signal and either one of a read request signal requesting the received packets to be decoded and a discard candidate read command signal output when the queue reaches the discard start threshold. In a fifth step, either one of the discarding and decoding of the received packets read out is selected. In a sixth step, when the discarding is selected, at least one of the received packets is discarded from the head of the queue while whether or not the length of the queue has reached the discard end threshold is determined. In a seventh step, when the decoding is selected, the received packets read out is decoded.

BRIEF DESCRIPTION OF THE DRAWINGS

The objects and features of the present invention will become more apparent from the consideration of the following detailed description taken in conjunction with the accompanying drawings in which:

FIG. 14 is a timing chart showing a relation between received packets and reproduced speech data particular to the embodiment of FIG. 12; and FIG. 15 is a timing chart showing a relation between received packets and reproduced speech data that holds when the same received packets as the packets shown in FIG. 14 are applied to the embodiment of FIG. 2.

DESCRIPTION OF THE PREFERRED EMBODIMENTS

Figure 1:
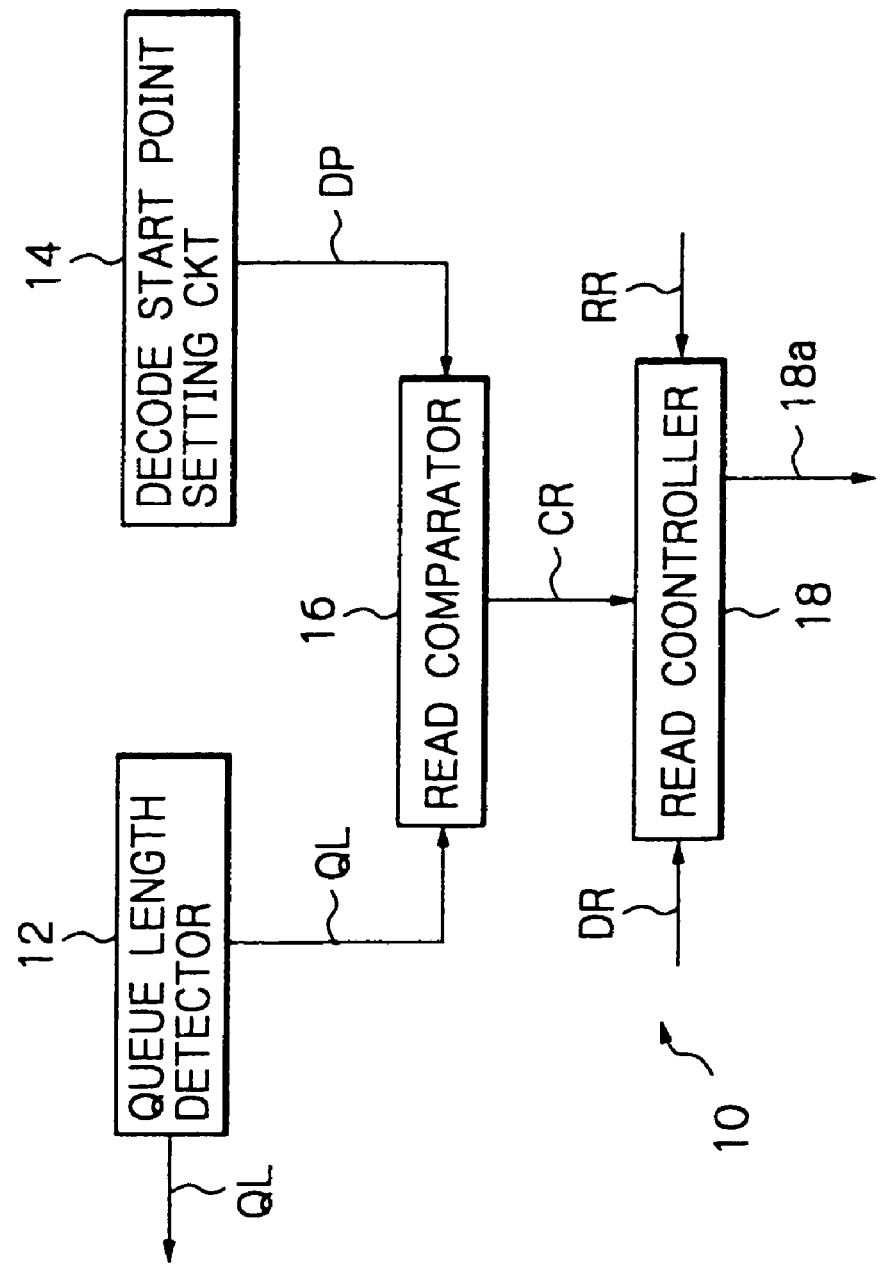
FIG. 1 is a block diagram schematically showing a buffer controller included in a packet receiver embodying the present invention.

Referring to FIG. 1 of the drawings, a buffer controller included in a packet receiver embodying the present invention is shown and generally designated by the reference numeral 10. In FIG. 1, structural elements not directly relevant to the understanding of the present invention are not shown. Signals are designated by reference numerals attached to signal lines on which they appear. As shown, the buffer controller 10 is generally made up of a queue length detector 12, a decode start point setting circuit 14, a read comparator 16, and a read controller 18.

The queue length detector 12 performs real-time detection of the length of a queue that is formed by stored packets. The queue may contain packets other than received packets, e.g., error packets together with the received packets. The detector 12 receives address data representative of the positions of a buffer, which will be described specifically later, as well as other necessary data, although not shown specifically. A queue length, labeled QL, output from the detector 12 is zero at the beginning of communication, but increases as received packets are sequentially written to the buffer. The queue length QL is input to the read comparator 16 and a diminishment control section 22b (see FIG. 2).

A decode start point or threshold 28, which will be described specifically later, is set in the decode start point setting circuit 14. In response, the setting circuit 14 delivers a decode start point signal DP corresponding to the value of the decode start point 28 to the read comparator 16. The decode start point 28, of course, exists on the queue. To obviate jitter, the setting circuit 14 sets the decode start point 28 in accordance with traffic on a communication network not shown.

The read comparator 16 compares the value of the queue length QL and that of the decode start point signal DP. When the value of the queue length signal QL becomes greater than the value of the decode start point signal DP, the read comparator 16 feeds a read command signal CR to the read controller 18.

The read controller 18 generates a control signal 18a for enabling an input buffer 22a (see FIG. 2) so as to control the read-out of the packets. More specifically, the read controller 18 delivers the control signal 18a to the input buffer 22a on receiving the read command signal CR and a read request signal RR. In response, the packets are sequentially read out of the input buffer 22a, one packet for one read request signal RR.

In addition to the above-described control, the read controller 18 executes control for reading the packets out of the input buffer 22a without regard to the read command signal CR or the read request signal RR. Specifically, a switching decision circuit 220b, which will be described later, feeds a discard candidate read command signal DR representative of, among the stored packets, candidates to be discarded to the read controller 18. In response, the read controller 18 also delivers the control signal 18a to the input buffer 22a. In this case, the control signal 18a causes the input buffer 22a to select packets to be discarded. In response to the read request signal RR, the read controller 18 causes the packets selected to be read out of the input buffer 22a at a time. Packets are therefore read out of the input buffer 22a as if they were read out a plurality of times for a single reading period. This is successful to reduce a delay time.

Figure 2:
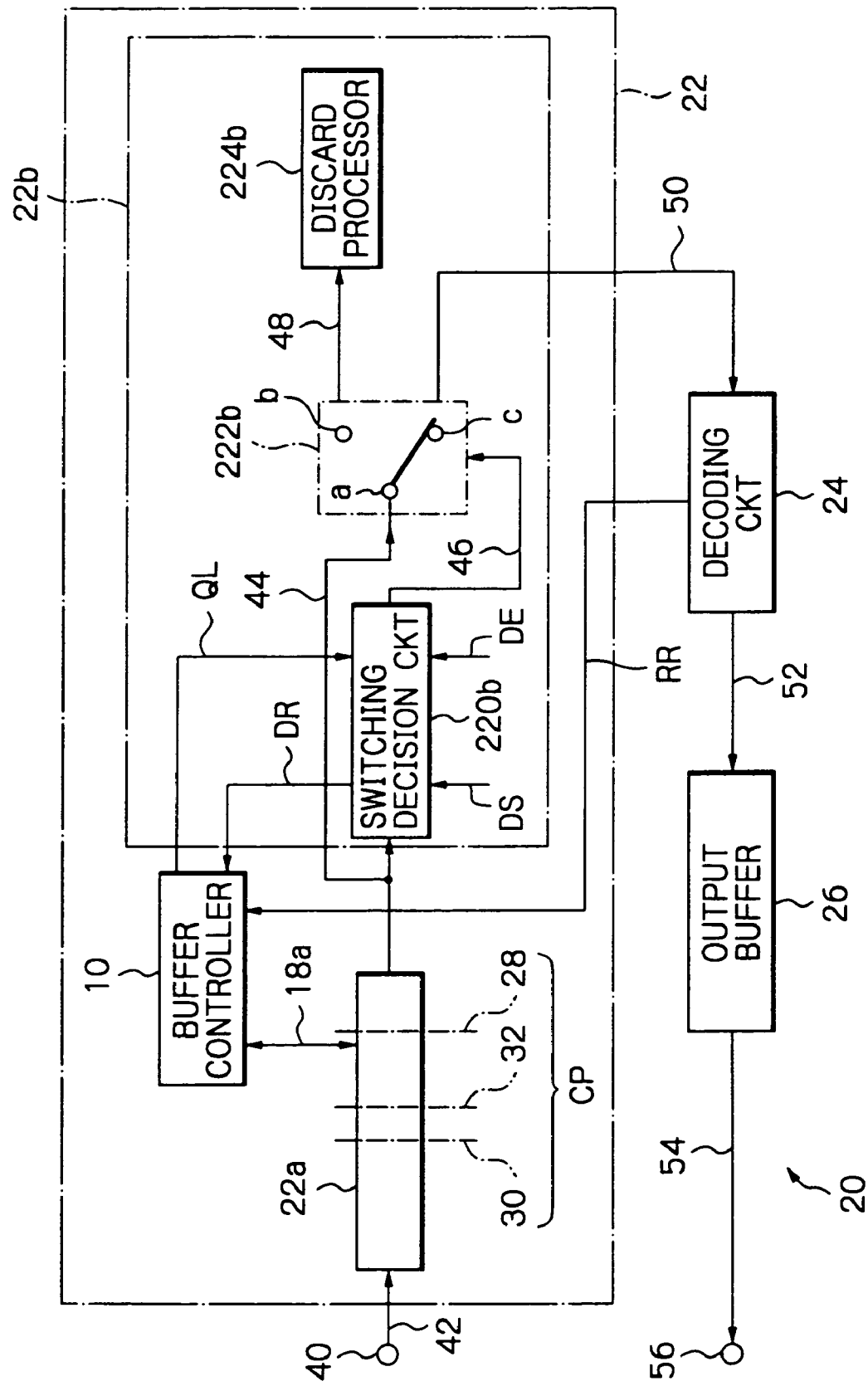
FIG. 2 is a schematic block diagram showing the packet receiver embodying the present invention.

FIG. 2 shows a packet receiver 20 embodying the present invention and including the buffer controller 10. As shown, the packet receiver 20 is generally made up of a receipt buffer section 22, a decoding circuit 24, and an output buffer 26. The receipt buffer control section 22 includes the buffer controller 10, which is one of characteristic features of the present invention.

The receipt buffer section 22 includes the input buffer 22a and diminishment control section 22b in addition to the buffer controller 10. The input buffer 22a is implemented by a FIFO (First-In First-Out) memory for temporarily storing packets 42 sequentially received by the packet receiver 20. The input buffer 22a should only store coded and then packetized data. The FIFO memory may therefore be replaced with a semiconductor memory, flush memory or similar memory device so long as the designed processing speed of the packet receiver 20 lies in a desired range. As for the input buffer 22a, not only the previously mentioned decode start point 28, but also a diminishment start point or threshold 30 and, if necessary, a diminishment end point or threshold 32 are set.

The diminishment start point 30 is a point on the queue where a diminishing or thinning operation should begin. The diminishment end point 32 is a point on the queue where the diminishing operation should end. The received packets 42 read out of the input buffer 22a are fed to the previously mentioned switching decision circuit 220b and a switch 222b, which are included in the diminishment control section 22b, as received packets 44. A discard processor 224b is also included in the diminishment control section 22b.

The diminishment control section 22b may be implemented by either one of electric circuitry and software. When use is made of software, the decode start point 28, diminishment start point 30 and diminishment end point 32 may be set by use of an equation that will be described later.

The switching decision circuit 220b makes a decision on the switching of the switch 222b and controls the switching. Specifically, the queue length signal QL output from the queue length detector 12, a diminishment start point signal DS representative of the value of the diminishment start point 30 and a diminishment end point signal DE representative of the value of the diminishment end point 32 are input to the switching decision circuit 220b. The switching decision circuit 220b determines whether the received packets 44 should be discarded or decoded in accordance with the above input signals QL, DS and DE. The switching decision circuit 220b feeds a switching control signal 46 representative of the result of the decision to the switch 222b. A diminishment start point setting circuit, not shown, and a diminishment end point setting circuit, not shown, set the value of the diminishment start point 30 and that of the diminishment end point 32, respectively.

Further, when deciding whether or not to discard the received packets 44, the switching decision circuit 220b references, in addition to the signals QL, DS and DE, the audio contents of the coded speech data contained in the packets 44 that are read out of the input buffer 22a. Therefore, as a result of this decision, the packets 44 which would critically influence speech quality if discarded are decoded while the packets 44 which would influence it little are discarded. The switching decision circuit 220b may add the result of the decision to the individual packet in the form of bit information. It is to be noted that referencing the audio contents is not essential with the illustrative embodiment because the influence of jitter can be reduced without resorting to the reference.

The switch 222b has a terminal a to which the received packets 44 are input. The switch 222b selects either one of terminals b and c in accordance with the switching control signal 46, thereby selecting the destination of the packets 44. The terminals b and c are connected to the discard processor 224b and decoding circuit 24, respectively. The switch 222b may select a destination in accordance with the bit information added to the individual packet by the switching decision circuit 220b, as stated earlier. In such a case, the signal line for feeding the switching control signal 46 is not necessary while the switch 222b functions in accordance with the bit information.

The discard processor 224b receives packets 48 via the switch 222b and discards them. Therefore, even when a packet loss occurs, the discard processor 224b prevents a speech from being continuously lost.

The decoding circuit 24 receives packets 50 via the switch 222b. The decoding circuit 24 includes a depacketizing circuit and a decoding circuit although not shown specifically. The depacketizing circuit depacketizes the packets 50 to thereby output speech data coded frame by frame. The decoding circuit decodes the coded speech data for thereby outputting the original speech data. As soon as the decoding circuit 24 fully decodes a packet 50 and becomes ready to decode the next packet 50, it delivers the previously mentioned read request signal RR to the buffer controller 10. Therefore, assuming that received packets have substantially the same length, then the decoding circuit 24 delivers the read request signals RR to the buffer controller 10 at substantially constant intervals in steady communication conditions. Consequently, the packets 44 are read out of the input buffer 22a at constant intervals.

The illustrative embodiment is practicable with any one of conventional speech coding and decoding systems. For example, use may be made of linear PCM (Pulse Code Modulation), ITU-T (International Telecommunication Union-Telecommunication Standardization Sector) Recommendation G.711 (μ rule PCM), G.726 (ADPCM (Adaptive Differential PCM)), G723.1 or G.729 (CS-ACELP (Algebraic Code Excited Linear Prediction)) or CELP (Coded Excited Linear Prediction).

A decoding process depends on a coding process used by a packet transmitter. Tendency ascribable to a coding process will be outlined hereinafter. Each coding system provides a single frame with a particular duration. For example, the duration of a single frame is 10 milliseconds (0.01 second) in the G.729 coding system or 30 milliseconds (0.03 second) in the G.723.1 coding system. Further, the number of frames to be contained in a single packet, i.e., a packet size or a packet length is dependent on the apparatus used.

A plurality of frames containing coded speech data constitute a single packet. A header, i.e., information particular to a communication system is added to the packet. It follows that a small packet size successfully reduces the delay time, but requires a higher communication rate. On the other hand, a large packet size does not require a higher communication rate, but aggravates the influence of a packet loss and the delay time.

The output buffer 26 has a storing function similar to that of the input buffer 22a. Specifically, the output buffer 26 temporarily stores decoded speech data 52 sequentially output from the decoding circuit 24. The speech data 52 are read out of the output buffer 26 and fed via an output terminal 56 as speech data 54.

Figure 3:
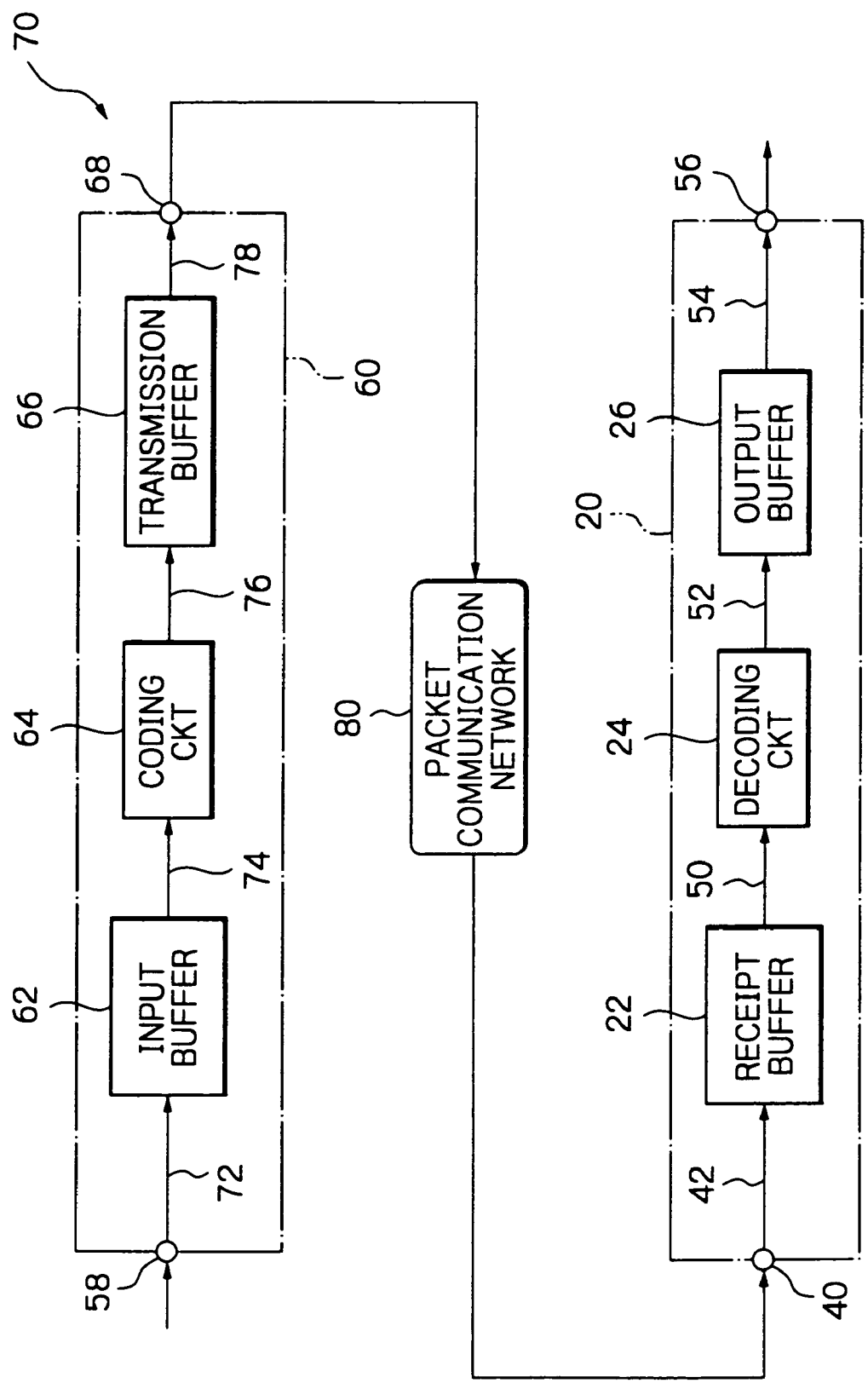
FIG. 3 is a block diagram showing a speech transmission and receipt system including the packet receiver of FIG. 2.

Reference will be made to FIG. 3 for describing a speech transmission and receipt system including the packet receiver 20 of the illustrative embodiment. As shown, the speech transmission and receipt system, generally 70, includes a packet transmitter 60, a packet communication network 80, and the packet receiver 20.

The packet transmitter 60 includes an input buffer 62, a coding circuit 64, and a transmission buffer 66. Speech data 72 are fed to the input buffer 62 via an input terminal 58. The input buffer 62 temporarily stores the speech data 72 and then delivers them to the coding circuit 64. The coding circuit 64 codes the speech data 72 frame by frame while feeding the resulting coded speech data 76 to the transmission buffer 66. The transmission buffer 66 not only stores speech data, but also serves part of a packetizing function under the control of a system controller, not shown, included in the packet transmitter 60. For example, the transmission buffer 66 stores consecutive frames until they coincide with the number of frames to be actually contained in a packet, and then adds header information to the individual frame, thereby packetizing the frames.

The packet transmitter 60 sends packets 78 output from the transmission buffer 66 to the packet receiver 20 via an output terminal 68 thereof and the packet communication network 80. The packet receiver 20 has the construction described with reference to FIG. 2.

Figure 4:
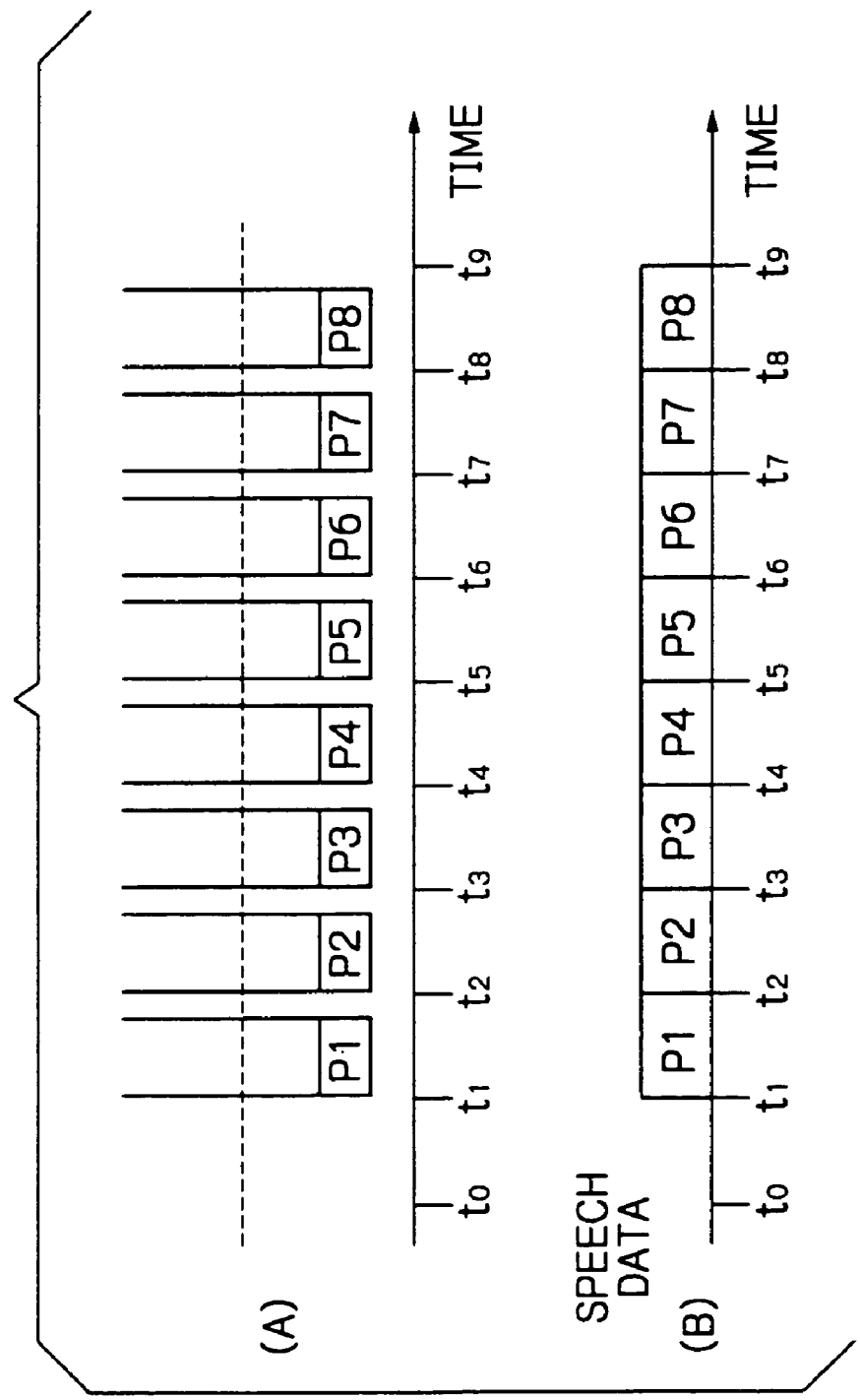
FIG. 4 is a timing chart demonstrating the ideal receipt of consecutive packets.

A comparative packet transmission and receipt system will be described with reference to FIGS. 4 and 5. A packet receiver included in the comparative system lacks the buffer controller 10 of the illustrative embodiment although it is not shown specifically. Assume that traffic on the packet communication network 80, FIG. 3, is in an ideal condition. Then, as shown in FIG. 4, (A), even the comparative system allows packets (frames) P1 through P8 sequentially output from a packet transmitter to be received by a packet receiver or receipt buffer at constant intervals without being lost. More specifically, the packets P1 through P8 arrive at the packet receiver during consecutive constant intervals T between times $t_1$ through $t_9$. The packet receiver therefore sequentially decodes the received packets P1 through P8 and outputs a speech without any interruption or skip, as shown in FIG. 4, (B). However, it is rare that the packet communication network 80 is in an ideal condition during communication.

Figure 5:
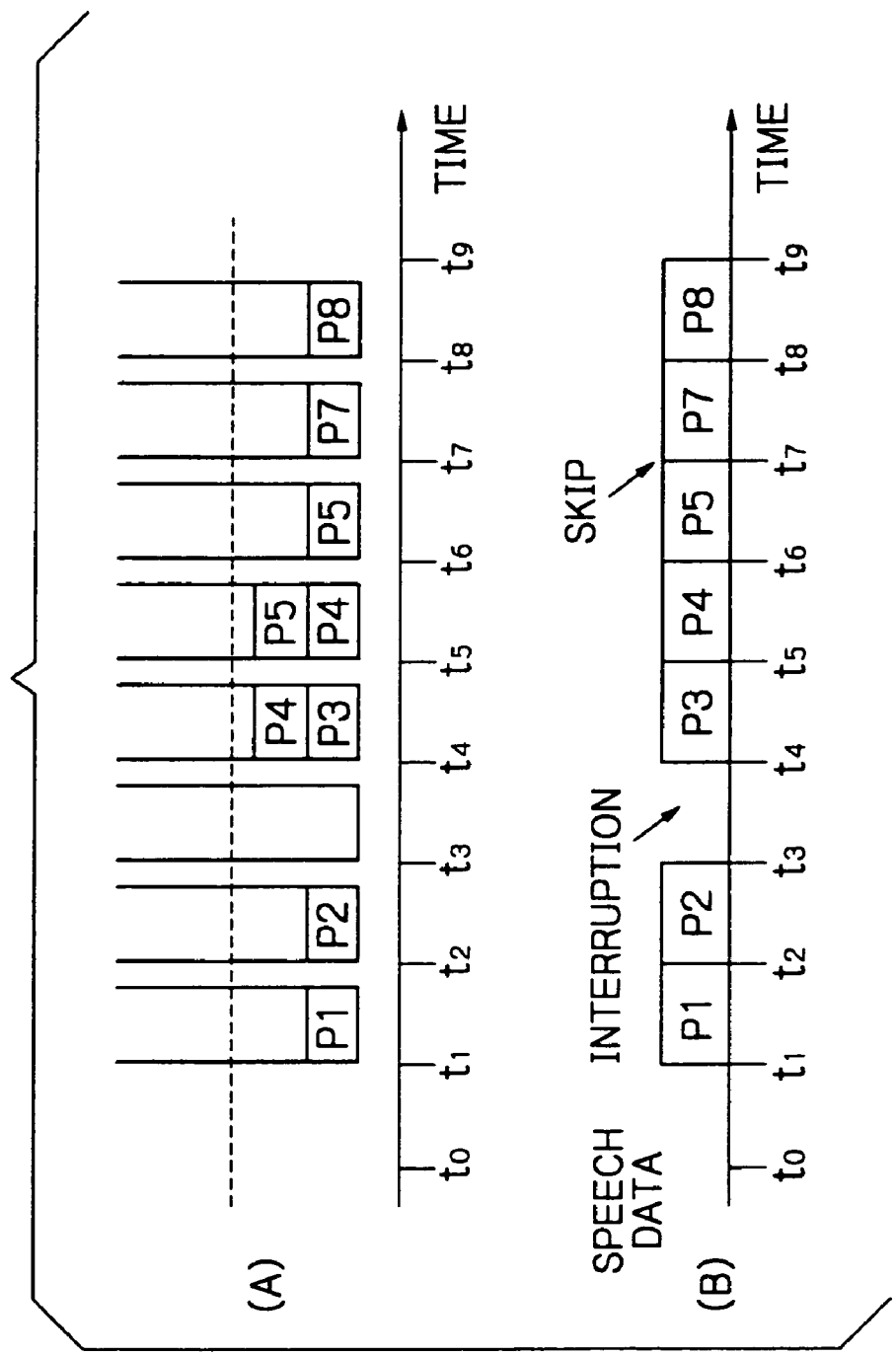
FIG. 5 is a timing chart representative of the influence of the undesirable traffic of a packet communication network on the storage of packets and reproduction of speech data.

As shown in FIG. 5, (A), assume that the arrival of the third packet P3 at the receipt buffer is delayed due to heavy traffic on the packet communication network 80, and that the sixth packet is lost. More specifically, assume that the packets P1 and P2 arrive at the expected times $t_1$ and $t_2$, respectively, but the packet P3 fails to arrive at the expected time $t_3$. Then, as shown in FIG. 5, (B), a memory location corresponding to the time $t_3$ remains idle. The packet P3 is stored in the receipt buffer together with the packet P4 arrived at the expected time $t_4$. Thereafter, the packets P4 and P5 are sequentially stored in the receipt buffer up to the time $t_5$.

Let a delay of a received packet from an absolute receipt time or reproduction time be referred to as a delay. In the specific case shown in FIG. 5, the reproduction delay is $(t_4-t_3)$. It will therefore be seen that at the time $t_4$ the received packets P3 and P4 are sequentially read out in this order. When the buffer becomes idle, packets are accumulated. The accumulation of packets does not simply mean the idle condition of the buffer, but means that an idle location exists in the buffer when data is requested. This idle state represented by the accumulation of packets will be referred to as a buffer idle state to occur when data is requested, in distinction from the substantially constant intervals T.

As shown in FIG. 5, (B), when the packets are decoded and output as a reproduced speech, the speech is interrupted between the times $t_3$ and $t_4$ while the delay thereof is aggravated. As shown in FIG. 5, (A), the packet P5 having just been received is allocated to the time $t_6$ due to the packet loss occurred on the packet communication network 80. Subsequently, the packet P7 is stored at the time $t_7$. As a result, as shown in FIG. 5, (B), the speech data skips at the time $t_7$ in the aspect of continuity. Although such a skip of speech data is not desirable, it cancels the past delay and allows speech data to be normally reproduced after the time $t_7$.

Hereinafter will be described some different principles unique to the illustrative embodiment. First, how the decode start point setting circuit 14 sets the decode start point or threshold 28 will be described. For example, when traffic on the packet communication network 80 is extremely light, consecutive packets are received at constant intervals, as stated earlier. In this condition, the decode start point 28 should only be set at a position spaced from the head of the input buffer 22a by one or two packets. Let a position close to the head of the input buffer 22a and a position far from the same be referred to as a shallow position (small value) and a deep position (large value), respectively.

So long as the jitter of received packets is zero because of the ideal condition of the packet communication network 80, the decode start point 28 may be set at the head of the input buffer 22a, i.e., zero packet. When the jitter corresponds to one or two packets, the decode start point 28 can be set at a shallow position corresponding to one or two packets without making the input buffer 22a idle. If the input buffer 22a is not idle, the buffer idle state mentioned earlier does not occur when a data read request is generated.

In the illustrative embodiment, the position of the decode start point 28 is translated into time because the number of packets can be represented by a period of time. For example, assume that a single packet has five frames, and that the data length of a single frame corresponds to 0.01 second. Then, a period of time corresponding to a single packet is 0.05 second (=0.01 second/frame×5 frames/packet×1 packet).

Two packets correspond to 0.1 second, which is two times as long as 0.05 second. Therefore, the decode start point 28 corresponding to one or two packets is set at a position corresponding to 0.05 to 0.1 second. Stated another way, such a decode start point 28 prevents the packet receiver 20 from outputting a speech for 0.05 to 0.1 second since the start of communication, i.e., the arrival of a packet 42. This period of time does not include a period of time necessary for the processing of the output buffer 26 and other blocks.

When traffic on the packet communication network 80 is extremely heavy, the jitter of the individual received packet increases. In this case, should the decode start point 28 be shallow, the input buffer 22a would become idle and would bring about the previously mentioned idle buffer state, resulting in the interruption of a speech and therefore the degradation of speech quality. To solve this problem, the decode start point 28 should be set at a deep position spaced from the head of the input buffer 22a by five to ten packets.

The time when a speech is actually output after the start of communication is more delayed as the position of the decode start point 28 becomes deeper. For example, when the decode start point 28 is set at the above-stated deep position, a speech will not be output for 0.25 to 1 second since the start of communication. This delay at the beginning of communication will be referred to as an initial delay. The initial delay is also one of delays and lowers communication quality. The decode start position 28 should therefore be set as shallow a position as possible at the beginning of communication.

Figure 6:
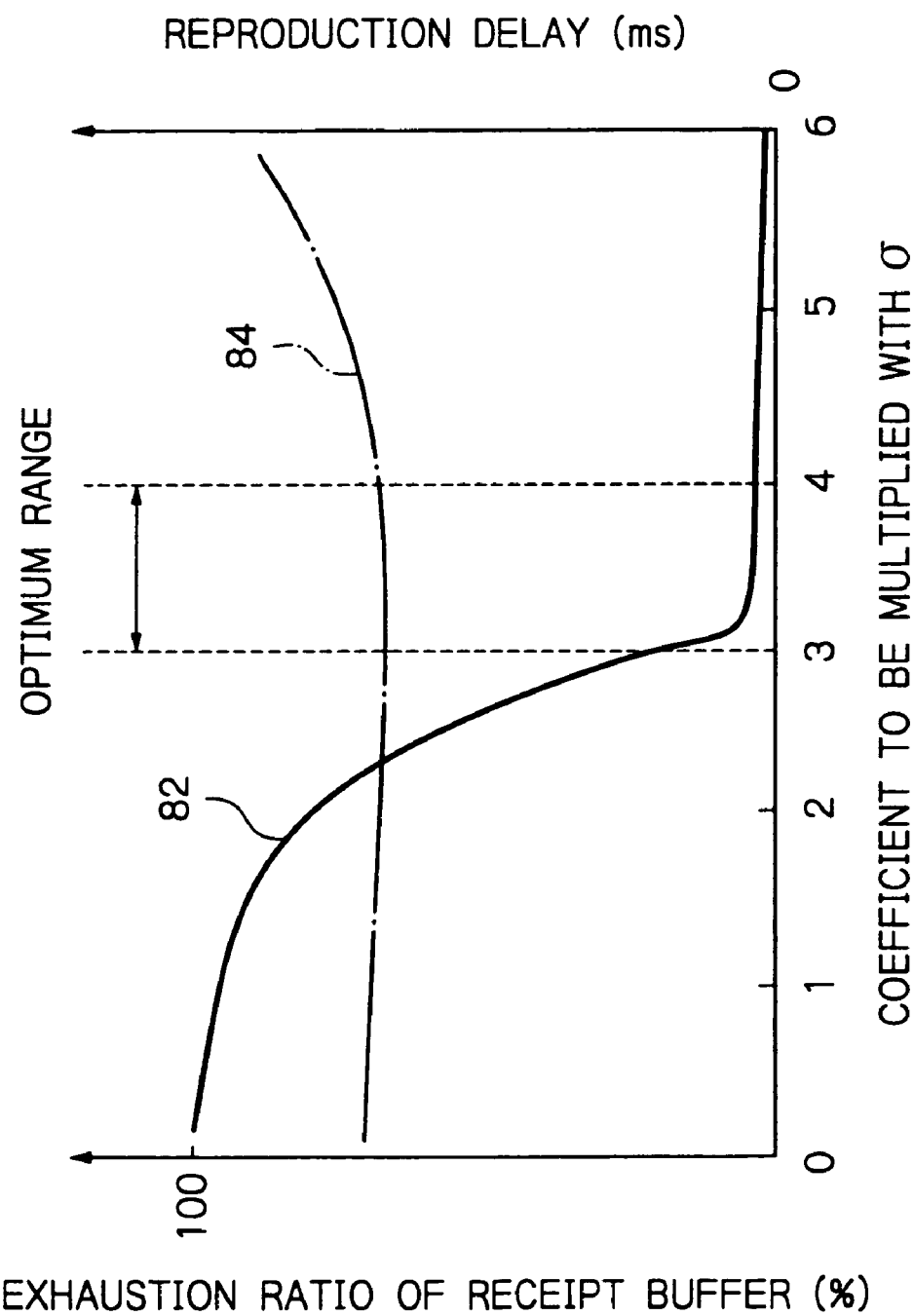
FIG. 6 is a graph showing a relation between an optimum decode start point and the jitter distribution of the packet communication network.

The operation based on the decode start point 28 has the above-described characteristic. It is preferable to set the decode start point 28 on the basis of the width of a jitter distribution particular to the packet communication network 80. The width of a jitter distribution can be represented by a standard deviation a. As shown in FIG. 6, the optimal range of decode start point 28 based on the width of a jitter distribution is between $3\sigma$ and $4\sigma$ in terms of standard deviation. In FIG. 6, the abscissa indicates the coefficient to be multiplied with the standard deviation a while the right and left ordinates indicate the exhaustion ratio (%) of the input buffer 22a and a reproduction delay time (ms), respectively. The exhaustion ratio of the input buffer 22a refers to a ratio in which the idle buffer state occurs in the input buffer 22a. As shown in FIG. 6, a solid curve 82 representative of the exhaustion ratio is close to zero so long as the coefficient of the standard deviation a is greater than $3\sigma$, but sharply increases as the coefficient a decreases below $3\sigma$. A dash-and-dot curve 84 representative of the reproduction delay time remains substantially constant so long as the coefficient $\sigma$ is smaller than $4\sigma$ but increases as the coefficient a exceeds $4\sigma$.

The high exhaustion ratio of the input buffer 22a and the long reproduction delay time both deteriorate speech quality during communication. To insure high speech quality, both of such factors must be confined in sufficiently narrow ranges. It follows that the optimal range of from $3\sigma$ to $4\sigma$ successfully reduces the above two factors at the same time.

More specifically, assume that the jitter distribution of the packet communication network 80 has a standard deviation $\sigma$ of 0.08 second. Then, the decode start point 28 may be set at 0.24 to 0.32 second. The buffer controller 10 does not read any received packet 44 out of the input buffer 22a from the above decode start point 28 to the point at which decoded data have been stored in the input buffer 22a by 0.24 to 0.32 second . During this period of time, no received packets are fed to the decoding circuit 24. With this scheme, it is possible to take a measure against jitter before the idle buffer state occurs. This is one of unprecedented features of the present invention.

Data diminishment, data thinning, executed against a packet loss together with the above-described measure against jitter will be described hereinafter. The diminishment start point 30, like the decode start point 28, is a point defined on a queue. Assume that the head of the input buffer 22a has a value PP while the decode start point 28, diminishment start point 30 and diminishment end point 32 have values 28P, 30P and 32P, respectively. Then, there holds a relation:

$$PP<28P<32P<30P \ldots \quad (1)$$

The above relation (1) teaches that the diminishment start point 30 should be set at a position coincident with or deeper than the position of the decode start point 28. However, if the position of the diminishment start point 30 is deep more than necessary, then the amount of data stored in the input buffer 22a, i.e., the length of a queue scarcely reaches the diminishment start point 30 and is apt to prevent the delay time from being reduced.

The diminishment end point 32 may be coincident with the diminishment start point 30 or the decode start point 28 or may intervene between the two points 28 and 30. Alternatively, the diminishment end point 32 may be set at a shallower position than the decode start point 28, although it is contrary to the relation (1).

A diminishing or thinning operation begins when the queue length reaches the diminishment start point 30. As a result, the amount of data stored in the input buffer 22a decreases up to the diminishment end point 32. If the diminishment end point 32 is set at a shallow position, then the input buffer 22a can cancel even a relatively long delay in a short period of time. However, such a position of the diminishment end point 32 is apt to make the input buffer 22a idle. A read request output from the decoding circuit 24 at this condition would bring about the idle buffer state described earlier, thereby interrupting a speech being reproduced.

Further, the shallow position of the diminishment end point 32 causes a speech being reproduced to skip. To obviate the skip of a speech, a buffer may be included in, e.g., the diminishment control section 22b for storing packets that should not be discarded, as determined by the switching decision circuit 220b. This is because at the time when the switching decision circuit 220b determines that a certain packet should not be discarded, the decoding circuit 24 may have not completed packet decoding. The above buffer, however, scales up the hardware of the packet receiver.

The diminishment end point 32 is not essential because only if information relating to the size of a delay is input to the switching decision circuit 220b, the diminishing operation does not exceed the size of the actual delay, i.e., excessive diminishment is obviated. In the illustrative embodiment, the diminishment end point 32 is provided with the same value as the diminishment start point 30. This means that the delay that can be reduced by a single diminishment is limited to a time width corresponding to a single packet. This time width will sufficiently cope with the usual range of delays particular to the packet communication network 80.

In the illustrative embodiment, not only the diminishment end point 32 but also the decode start point 28 are coincident with the diminishment start point 30. A point CP where the three points 28, 30 and 32 are coincident lies in a range of from 3σ to 4σ. For example, the point CP may be set at 3.5σ. The point CP lying in such a range makes the occurrence that the input buffer 22a becomes idle least probable, and minimizes the delay at the same time.

When the queue length exceeds the single position CP where the three points 28, 30 and 32 are coincident, one packet is read out of the input buffer 22a. If the packet read out has critical influence on speech quality, then it should not be discarded, so that the delay cannot be diminished this time. The packet is therefore stored together with a packet to be received next. At the time of the next receipt, the queue length is apt to again exceed the diminishment start point 30 and cause the diminishing operation to be executed. At this time, the diminishing operation reduces or practically cancels the delay. In this manner, the diminishing operation is repeated to maintain a normal state free from or substantially free from delays.

While the illustrative embodiment operates with both of the decode start point 28 and diminishment start point 30, either one of the two points 28 and 30 may be used, if desired.

The switching decision circuit 220b determines the degree of influence of each of the frames, which constitute a received packet, on speech quality. More specifically, in the illustrative embodiment, the switching decision circuit 220b executes a single diminishing operation with a single packet made up of a plurality of frames and determines whether or not to discard frame by frame. With this decision, it is possible to reduce a delay on a frame basis. The input buffer 22a and decoding circuit 24 each discard or decode data on a frame basis in place of a packet basis in accordance with the result of the decision.

Figure 7:
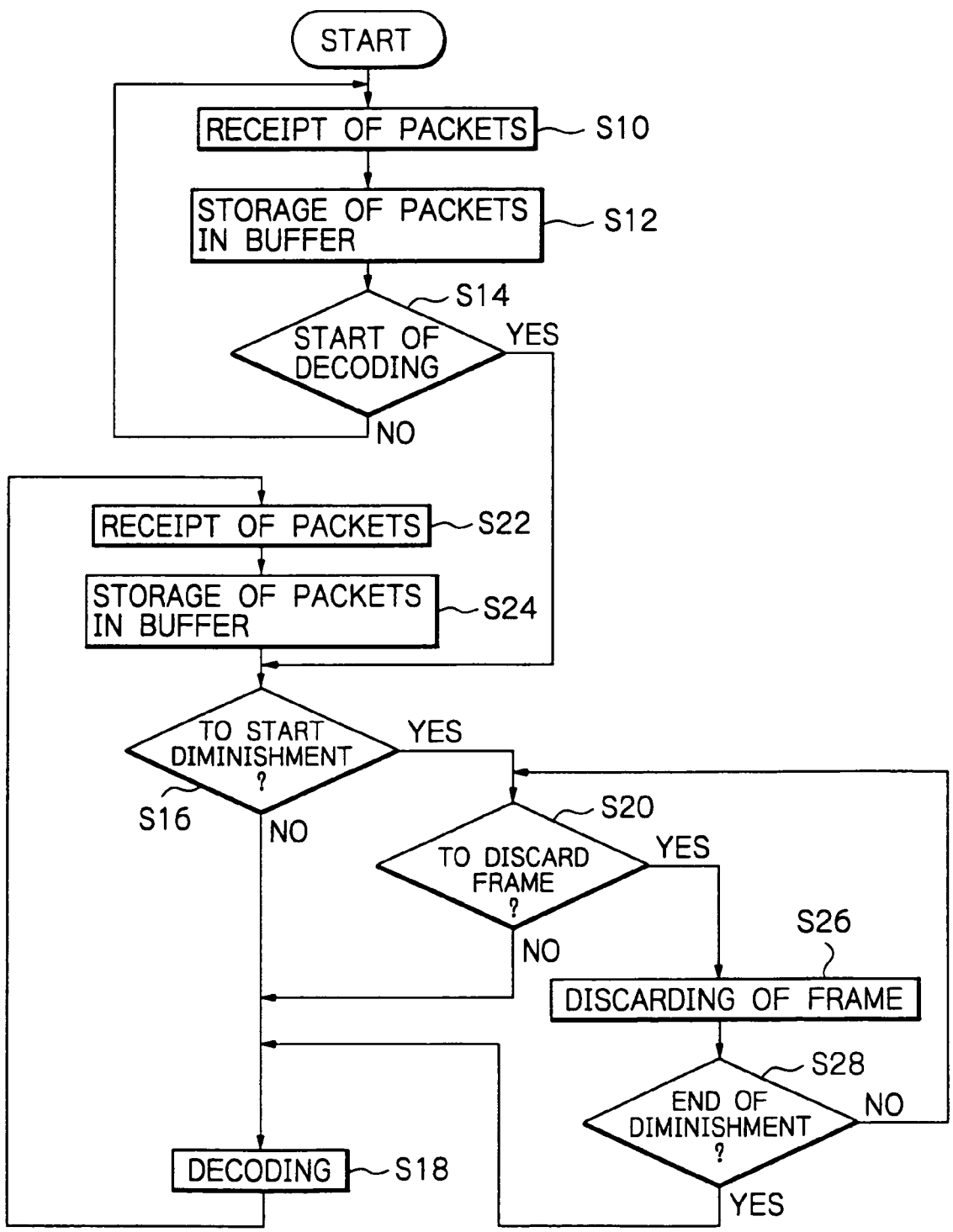
FIG. 7 is a flowchart showing a specific operation of the illustrative embodiment.

A specific operation of the illustrative embodiment will be described with reference to FIG. 7. A flowchart shown in FIG. 7 is universal because it is adaptive to a case wherein the relation (1) does not hold, i.e., the three points 28, 30 and 32 are not coincident, or a case wherein although the three points are coincident, the packet length is not constant and makes it impractical to execute the discarding and decoding processing on a packet basis or a frame basis.

First, the speech transmission and receipt system 70 sends packets to the packet receiver 20 via the packet transmitter/receiver 60 and packet communication network 80. As shown in FIG. 7, the packet receiver 20 receives the packets while sequentially feeding them to the receipt buffer 22a via the input terminal 40 (step S10). The received packets 42 are sequentially stored in the input buffer 22a (step S12) Subsequently, decode start control is executed in accordance with whether or not the amount of data existing in the input buffer 22a has exceeded the decode start point 28 (step S14). Specifically, in the step S14, the read comparator 16 compares a detected queue length QL and the value of the decode start point 28. If the queue length QL is short of the decode start point 28 (NO, step S14), the operation returns to the step S10. If the queue length QL is greater than the value of the decode start point 28 (YES, step S14), the operation advances to diminishment control (step S16).

Figure 8:
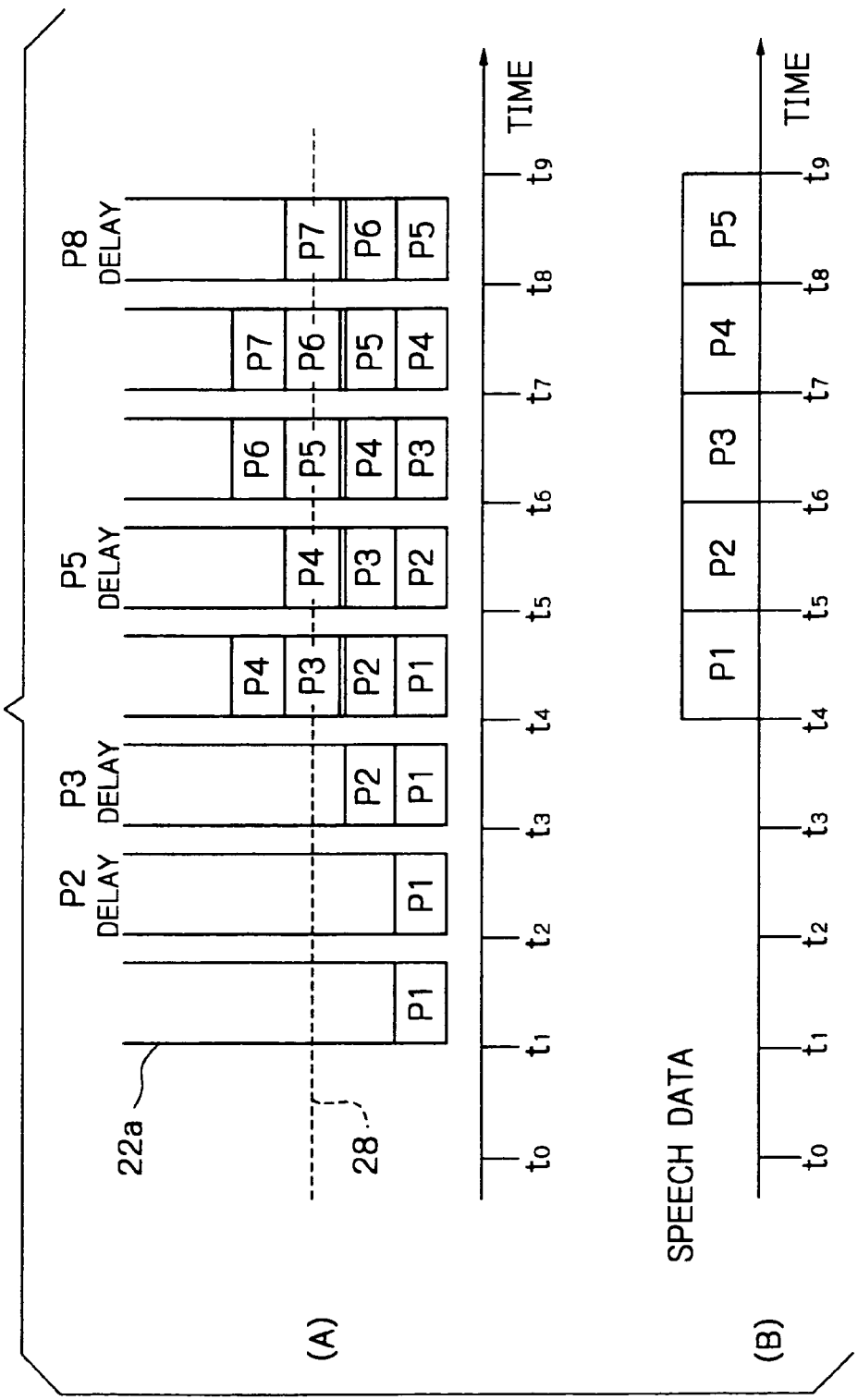
FIG. 8 is a timing chart showing a relation between received packets sequentially stored in an input buffer included in the illustrative embodiment and reproduced speech data.

The decode start control (step S14) will be described more specifically with reference to FIG. 8, (A). As shown, at a time $t_1$, only a received packet P1 is stored in the input buffer 22a. At this instant, the queue length QL is short of the value of the decode start point 28, so that the packet P1 is not read out of the input buffer 22a. The next packet P2 expected to arrive at a time $t_2$ does not arrived at the time $t_2$ due to a delay. The input buffer 22a therefore remains in the same condition at the times $t_1$ and $t_2$.

At a time $t_3$, the packet P2 arrives at the packet receiver 20 and is stored in the input buffer 22a while a packet P3 expected to be received at the time $t_3$ has not arrived yet due to a delay. As a result, the queue length QL increases, but is still short of the decode start point 28, preventing the packets from being read out of the input buffer 22a. Although the decoding circuit 24 repeatedly sends the read request signal RR to the read controller 18 at the times $t_1$ through $t_3$, the loop consisting of the steps S10 through S16 is repeated because the result of comparison does not satisfy the preselected condition. During this period of time, a speech shown in FIG. 8, (B), is not output.

At a time $t_4$, the packet P3 and a packet P4 are sequentially received and stored in the input buffer 22a. At this time, the queue length QL exceeds the decode start point 28, so that the read comparator 16 delivers the read command signal CR to the read controller 18. In response, the read controller 18 enables the input buffer 22a. Subsequently, in response to the read request signal RR, the read controller 18 reads the packet P1 stored in the input buffer 22a first out of the input buffer 22a. Even after the time $t_4$, successive received packets have been varied and delayed in various ways due to, e.g., varying traffic on the packet communication network 80. However, because the queue length QL of the input buffer 22a remains greater the value of the decode start point 28, the packet P2 and successive packets are sequentially read out of the input buffer 22a at the constant intervals T in response to the successive read request signals RR. Such a packet reading sequence implements universality.

Referring again to FIG. 7, if the answer of the step S14 is YES, the switching decision circuit 220b determines whether or not to effect diminishment on a packet basis in accordance with the queue length QL (step S16). At this instant, the switching decision circuit 220b additionally determines whether or not the traffic on the packet communication network 80 lies in a normal range. If the traffic lies in the normal range, the rate of extension of the queue length QL also lies in a normal range. In this case, the switching decision circuit 220b determines that diminishment is not necessary (NO, step S16), and causes the decoding operation to begin (step S18).

If traffic on the packet communication network 80 and therefore the queue length QL does not lie in the normal range, the switching decision circuit 220b determines that diminishment is necessary (YES, step S16). The switching decision circuit 220b then determines whether or not the packet (or the frame) to be diminished can be discarded (step S20). Assume that the rate of extension of the queue length QL sharply varies and exceeds the diminishment start point 30 represented by the diminishment start point signal DS. Then, the switching decision circuit 220b sends the discard candidate read command signal DR to the read controller 18. The packet read out in response to the signal DR is a candidate to be discarded.

In the step S18, the decoding circuit 24 performs processing inverse to coding with each frame of the received packet except for header information. The resulting reproduced speech data are output via the output buffer 26. This is followed by packet receipt (step S22) although decision processing is not shown specifically in FIG. 7; a received packet is stored in the input buffer (step S24). The step S24 is also followed by the step S16.

In the step S20, whether or not to discard the packet (or one frame of data) read out as a candidate is determined on the basis of the degree of auditory influence of the packet on speech quality, as stated earlier. If the packet has critical influence on speech quality, then it is not discarded (NO, step S20), but decoded (step S18); if otherwise (YES, step S20), the packet is discarded (step S26). More specifically, information indicative of whether the candidate is sound, medium sound or soundless is detected, and the candidate is discarded if it is soundless. Such information is included in, e.g., frame data generated by a soundless compressing function available with the G.723.1 coding system or the G.729 coding system, and facilitates the decision. When the frame data selected is discarded, a delay ascribable to the delays occurred on the packet communication network 80 can be smoothly reduced. Because frame data itself includes a criterion for the decision, six soundless frames, for example, can be collectively discarded when occurring continuously.

Another specific procedure available for the above-described decision will be described hereinafter. Assume that frame data does not include the criterion for the decision. Then, the sound pressure level of a frame having just been decoded is calculated and then compared with a reference level. If the actual sound pressure level is lower than the reference level, the above frame is determined to be soundless. Then, a frame next to the soundless frame is discarded. Subsequently, a frame following the discarded frame is decoded. This specific procedure is derived from the fact that a sound pressure level generally does not suddenly change from a soundless level to a sound level. That is, a frame following a soundless frame can be safely considered to be also a soundless frame. For example, when six soundless frames occur continuously, three frames are discarded frame by frame.

After the above-described decision, the switching decision circuit 220b delivers the switching control signal 46 to the switch 222b. In response, the switch 222b selects the terminal b in the event of discarding or selects the terminal c in the event of decoding. Furthermore, while making the decision, the switching decision circuit 220b determines whether or not the queue length QL has reached the value of the diminishment end point 32, i.e., whether or not the diminishing operation has ended (step S28). If the answer of the step S28 is NO, the procedure returns to the step S20. If the answer of the step S28 is YES, the procedure advances to the step S18. As a result, the queue length QL becomes smaller than the value of the diminishment end point 32, so that the delay is reduced. As shown in FIG. 8, (B), the speech is continuously reproduced from the time $t_4$ to a time $t_9$.

The procedure described with reference to FIG. 7 is only illustrative and may be changed or modified, as desired. For example, assume that the single position CP is set, and that the packet length to deal with is equal to the length of each received packet. Among the steps shown in FIG. 7, the loop consisting of the steps S16, S18, S22 and S24 should be executed every time a new packet is input to the input buffer 22a, and is therefore repeated a great number of times. By reducing the number of steps constituting the above loop or the number of times of repetition of the same loop, it is possible to reduce the amount of processing required of the program and the rate of execution of the program.

Specifically, in a specific modified procedure, the steps S10 through S14 shown in FIG. 7 are omitted. Also, the procedure begins at the step S22 in place of the step S16. In the modified procedure, too, whether a packet should be discarded or decoded is determined on the basis of the result of the decision made in the step S20. Further, the step S28 is also omissible because discharging one packet obviously makes the queue length QL smaller than the value of the common position CP. Specifically, when the queue length QL reaches the value of the single position CP, whether one packed read out should be discarded or coded may be determined on the basis of the result of the decision made on the diminishment start with the above packet. This completes one turn of the modified procedure. Because the packet is read out in response to the discard candidate read command signal DR, another packet can be read out in response to the read request signal RR during the interval T after the discarding of the above packet.

The simplified procedure described above may impair universality as to the sequence of packet receiving steps and may slightly lower the accuracy of control over the queue length QL of the input buffer 22a. However, the simplified procedure noticeably simplifies the sequence of steps and therefore enhances rapid processing while reducing loads as to the processing ability.

Figure 9:
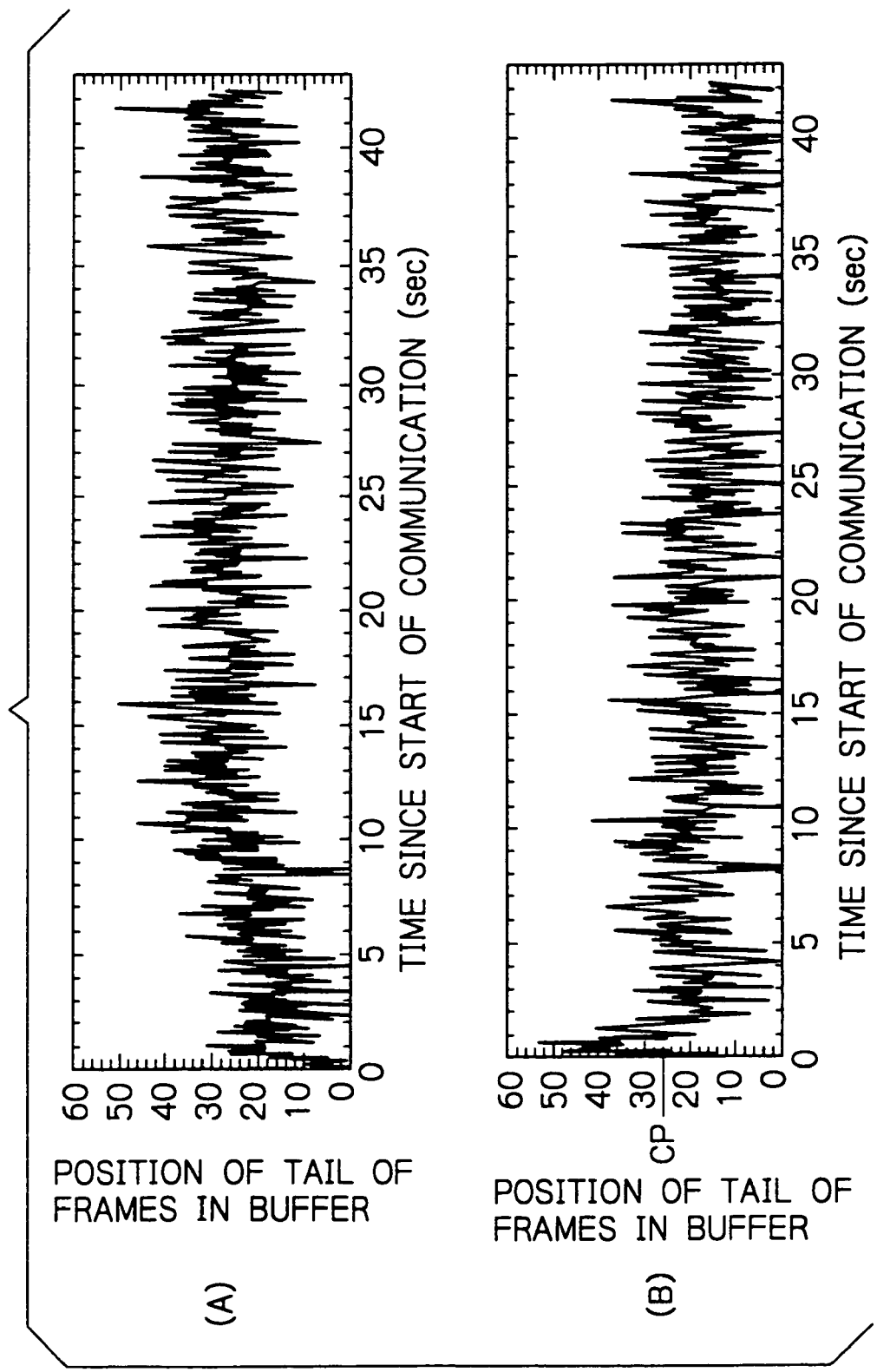
FIG. 9 is a view showing how the tail of the buffer differs in position from a case wherein the receipt buffer of a packet receiver is controlled to a case wherein it is not controlled.

In FIG. 9, parts (A) and (B), each plot the number of frames representative of a queue length, as counted at the tail of frames in the buffer, with respect to the time elapsed since the beginning of communication. The relations shown in FIG. 9, parts (A) and (B), were observed when the diminishing operation was not effected and when it was effected, respectively. As for the diminishing operation, both the diminishment start point DS and diminishment end point DE were set at the point CP that was selected to be twenty-eight frames. Twenty-eight frames lies in the previously mentioned range of from $3\sigma$ to $4\sigma$. It will be seen that the queue length QL shown in FIG. 9, (B), stably varies at shorter positions than the queue length QL shown in FIG. 9, (A). Although the idle buffer state, in which the queue length QL is a zero frame, occurs more frequency in FIG. 9, (B), than in FIG. 9, (A), such an idle buffer state is not always the idle buffer state occurring when a read request is generated. What is important to note is that the variation of the queue length QL is controllable in accordance with the contents of the diminishing operations, such as the diminishment start point and the diminishment end point.

By so effecting the diminishing operation, the queue length QL is stabilized at shallow positions at the tail of the data stored in the input buffer 22a. This means that a waiting time up to the decoding of a received packet and therefore a delay is reduced. When the idle buffer state is likely to occur in the presence of a read request due to, e.g., a packet loss, an error frame imitating the information of a frame having just been decoded may preferably be fed to the decoding circuit 24. This is also successful to reduce the interruption of a reproduced speech and therefore to improve speech quality.

The function using the decode start point absorbs jitter derived from packet delay, which is ascribable to, e.g., the packet communication network 80, and thereby allows a speech to be reproduced without any interruption. The diminishing operation not only reduces a delay, but also prevents a speech from skipping while maintaining speech quality. In addition, because a minimum of additional software suffices to implement the control using the decode start point and diminishment start point, the control scarcely effects the amount of calculations, calculation speed, and cost performance. Moreover, only one time of comparison implemented by software suffices to execute the control over the start of decoding and diminishing operation, obviating the need for additional calculations or costs. Also, the control over the start of decoding and diminishing operation are practicable without resorting to allocation and other wasteful steps otherwise required to grasp delay times and reduce delays.

Figure 10:
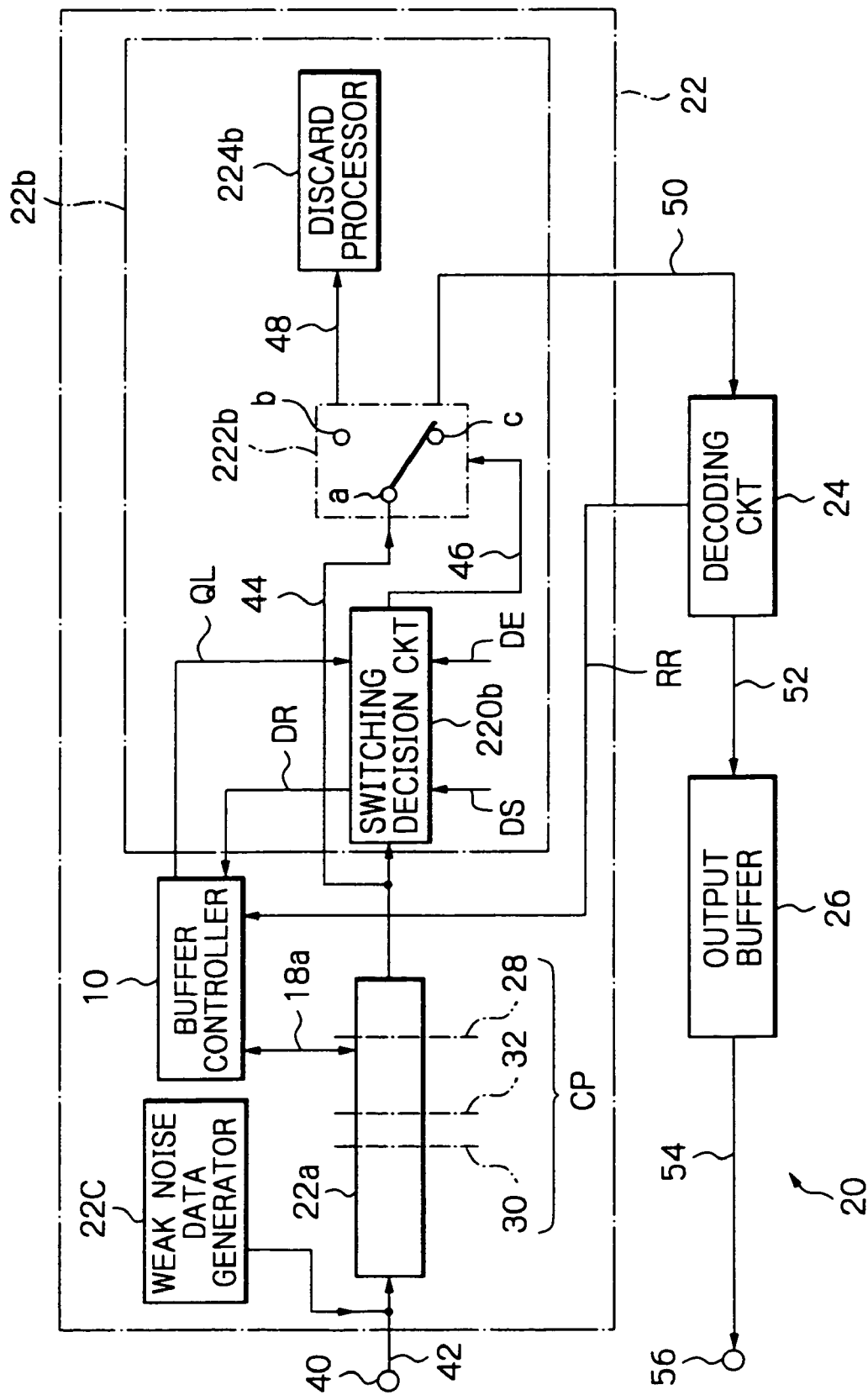
FIG. 10 is a schematic block diagram showing an alternative embodiment of the present invention.

Referring to FIG. 10, an alternative embodiment of the present invention will be described. In FIGS. 2 and 10, identical structural elements are designated by identical reference numerals and will not be described specifically in order to avoid redundancy. As shown, the packet receiver 20 shown in FIG. 10 additionally includes a weak noise data generator 22c. The weak noise data generator 22c is included in the receipt buffer 22 and connected to the input of the input buffer 22a. The weak noise data generator 22c is a memory storing weak noise data referred to as dummy frames. After a power switch, not shown, included in the packet receiver 20 has been turned on or after the end of communication, the weak noise data generator 22c outputs the dummy frames in such a manner as to fill up a gap between the head of the input buffer 22a and the decode start point 28.

Figure 11:
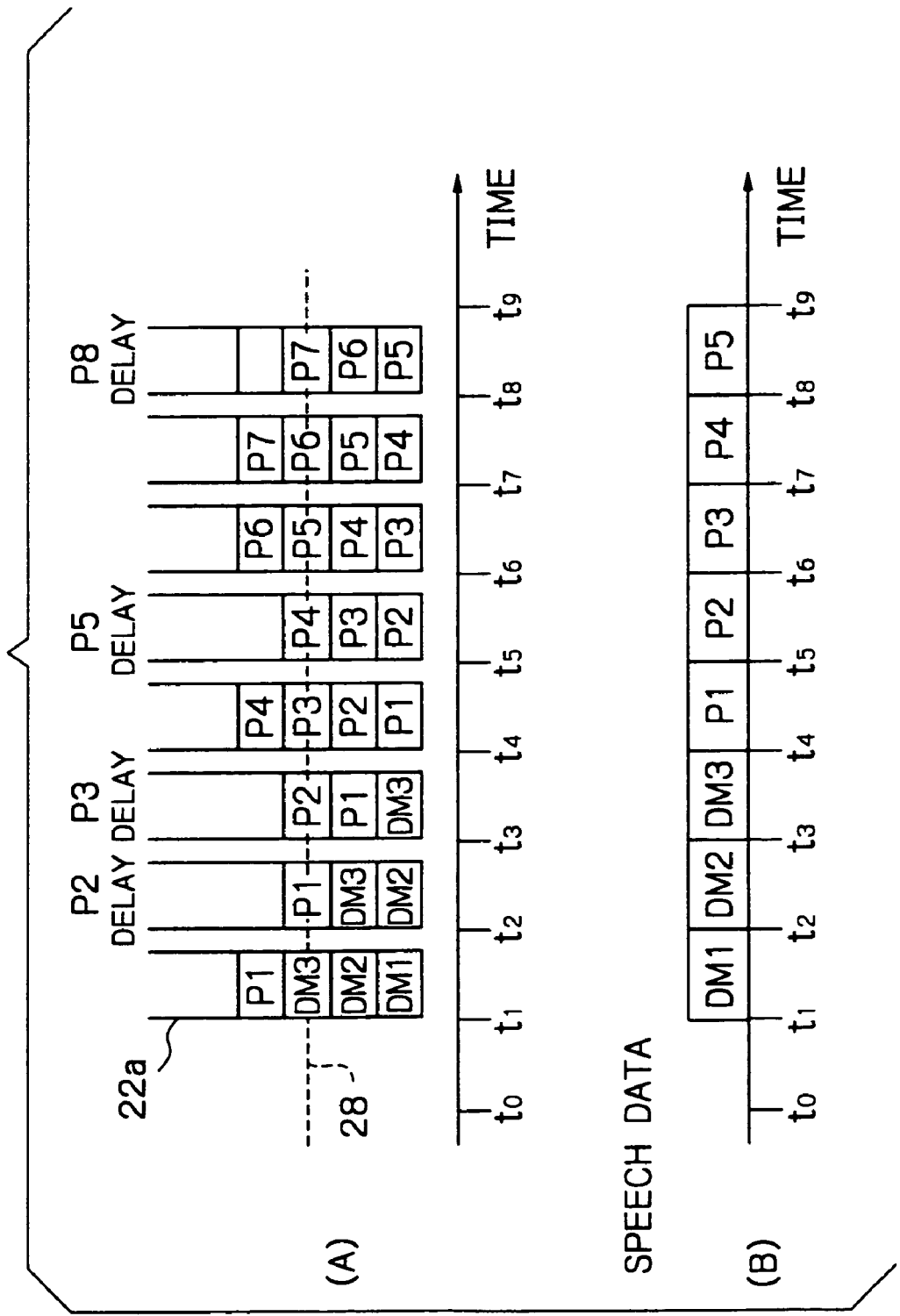
FIG. 11 is a timing chart showing a relation between received packets and reproduced speech data particular to the embodiment of FIG. 10.

As shown in FIG. 11 specifically, the dummy frames fed from the weak noise data generator 22c and received packets form a queue in the input buffer 22a. As shown, after the turn-on of the power switch of the packet receiver or after the end of the previous communication, the dummy frames are stored in the input buffer 22a up to the decode start point 28 at at least the time $t_1$. For example, at a time $t_0$ when the next communication begins, three dummy frames DM1 through DM3 have already been stored in the input buffer 22a. Such dummy frames are also input to the input buffer 22a at preselected intervals even after the time $t_1$ such that the sum of the dummy frames and the received packets does not decrease below the decode start point 28 (see FIG. 11). The dummy data constituting dummy frames may be identical with each other. The weak noise data implementing dummy frames may be replaced with any other sound data, if desired.

In operation, at the beginning of communication, the decoding circuit 24 sends a read request signal RR to the read controller 18. In response, the read controller 18 causes the dummy frames DM1 through DM3 to be read out of the weak noise data generator 22c in this order and decoded; the dummy frame DM1 is positioned at the head of the queue. As a result, weak noise is input to the decoding circuit 24 without regard to traffic on the packet communication network 80 up to the time when the received packet P1 is decoded, i.e., from the time $t_1$ to the time $t_4$. With the weak noise, the packet receiver 20 is capable of reducing the influence of the initial delay on the communication and notifying the user of the start of communication. This embodiment is therefore advantageous over the previous embodiment in that it prevents the user from feeling uneasy.

Furthermore, if the dummy frames are stored in the input buffer 22a up to the decode start point 28 at at least the time $t_1$, the illustrative embodiment can surely start reproducing speech data at the time $t_4$ despite any delay of the following received packets P2 and P3. The position for surely starting reproducing speech data is variable on the basis of the position of the decode start point 28 because the position of reproduction corresponds to the position of the decode start point 28. In this manner, even when traffic on the packet communication network 80 is heavy, the dummy frames stored in the input buffer 22a allow the packet receiver 20 to reduce the initial delay more than in the previous embodiment. Stated another way, the initial delay varies each time of communication in the previous embodiment, but remains stable and is shorter in this embodiment. This embodiment is, of course, capable of absorbing jitter like the previous embodiment.

Figure 12:
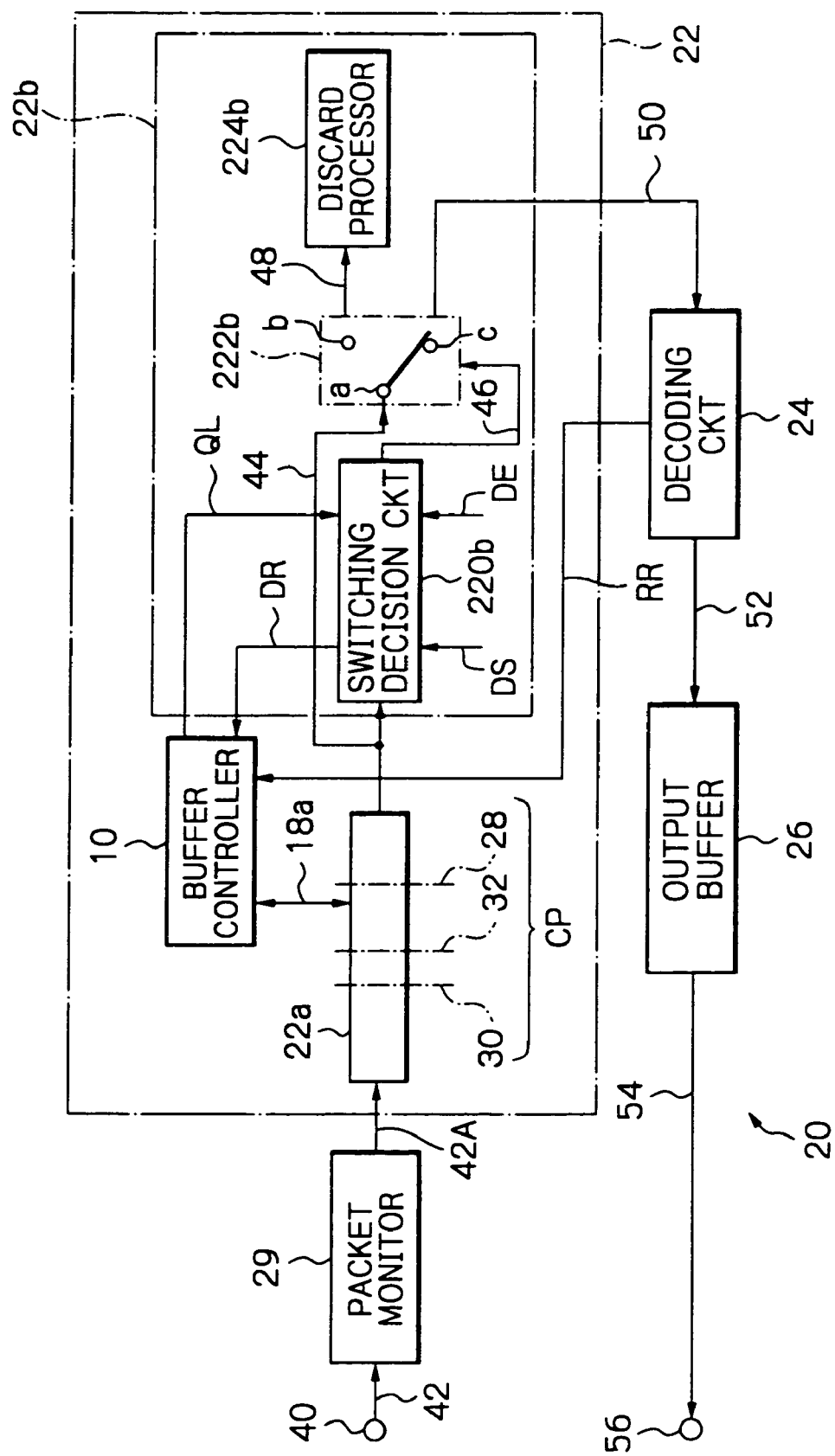
FIG. 12 is a schematic block diagram showing another alternative embodiment of the present invention.

Another alternative embodiment of the present invention will be described with reference to FIG. 12. In FIGS. 2 and 12, identical structural elements are designated by identical reference numerals and will not be described specifically in order to avoid redundancy. As shown, the illustrative embodiment additionally includes a packet monitor circuit 29 connected to the input of the input buffer 22a. The packet monitor circuit 29 feeds a packet signal 42A to the input buffer 22a in accordance with the result of monitoring.

Figure 13:
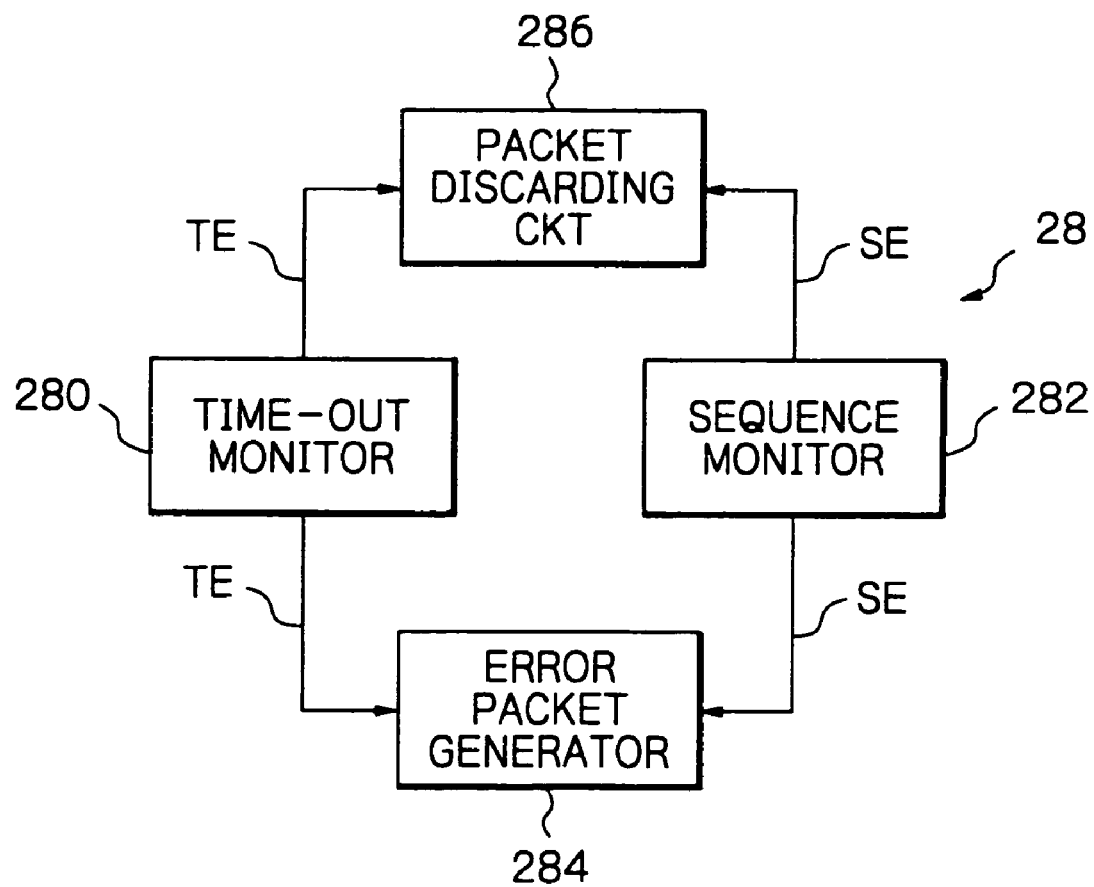
FIG. 13 is a schematic block diagram showing a specific configuration of a packet monitor included in the embodiment of FIG. 12.

As shown in FIG. 13 specifically, the packet monitor circuit 29 is generally made up of a time-out monitor 280, a sequence monitor 282, an error packet generator 284, and a packet discarding circuit 286. The blocks 280 through 286 may each be implemented as a single unit. Either one of the time-out monitor 280 and sequence monitor 282 may be omitted, if desired.

The time-out monitor 280 has a timepiece function and a function of monitoring the receipt of packets. Specifically, the time-out monitor 280 calculates a time at which a preselected period of time expires, and counts a period of time expired since the start of communication or an interval between the communication start time and the current time with the timepiece function. The above preselected period of time (time-out time hereinafter) is set in the time-out monitor 280 and representative of a delay time that is allowable in a jitter-free condition. The time-out time is therefore the sum of the expected time at which a packet should arrive and the above preselected period of time.

As for the function of monitoring the receipt of packets, the time-out monitor 280 determines whether or not a packet has arrived within a time-out time assigned thereto. When the time-out monitor 280 detects the time-out of a certain packet, it delivers a time-out error signal TE to the error packet generator 284 and packet discarding circuit 286. A packet loss is also causative of the time-out of a packet.

Assuming that the time-out time is $S_n$ in the absence of jitter is $S_n$, then the time-out time $S_n$ is expressed as:

$$S_n = n \cdot f \cdot t \ldots \quad (2)$$

where n denotes the n-th received packet, f denotes a packet size, and t denotes the duration of a single frame or one frame time.

The sequence monitor 282 determines whether or not a packet received via the packet communication network 80 is correct in the sequence of receipt. If the sequence of receipt is not correct, the sequence monitor 282 feeds a sequence error signal SE to the error packet generator 284 and packet discarding circuit 286. The sequence monitor 282 may also have a timepiece function, if necessary. A sequence error may also occur when the sequence of packets is inverted or a packet loss occurs during transfer via the packet transfer network 80.

The error packet generator 284 generates an error packet in response to a generation command and inserts the error packet in the position of a packet where an error has occurred. The error packet is a single packet of frames storing the same weak noise data or similar speech data as the dummy data constituting the dummy frames. The queue therefore includes such error packets also.

The packet discarding circuit 286 discards a packet received via the packet communication network 80 and corresponding to the inserted error packet.

One or both of the time-out monitor 280 and sequence monitor 282 included in the packet monitor circuit 29 detect a receipt error. For example, when a packet loss occurs in a certain received packet, the packet is not received within a preselected time-out time with the result that the time-out monitor 280 outputs the time-out error signal TE. At the same time, a packet expected to follow the above packet is input to the sequence monitor 282, skipping the expected packet. As a result, the sequence monitor 282 outputs the sequence error signal SE. In this manner, it is likely that the error signals TE and SE are output at the same time. In such a case, to prevent two error packets from being generated at the same time, the error packet generator 284 should preferably generate an error packet in response to the error signal TE or SE input thereto first while neglecting the error signal input later.

The packet monitor circuit 29 identifies the individual packet fed when its structural elements are operating normally. For the identification, the packet monitor circuit 29 uses packet identification information representative of, e.g., a sequence number or packet number or the time of generation or the transmission of a packet (time stamp information) added to the individual packet by the packet transmitter 60.

To monitor packets as to a packet loss and the inversion of the sequence of arrival, the packet monitor circuit 29 may use any desired kind of information, including the packet number, time-out time and time stamp information, so long as it can monitor packets. Even unique information may be added to the individual packet. Typical of unique information are a sequence number particular to TCP/IP (Transmission Control Protocol/Internet Protocol) and a sequence number and a time stamp particular to UDP/IP (User Datagram Protocol/Internet Protocol).

More specifically, when the sequence number of a given received packet is not coincident with the sum of the sequence number of a received packet preceding it and 1 (one), the packet monitor circuit 29 determines that a packet loss has occurred or that the sequence of arrival has been inverted. Further, when the time stamp of a received packet and that of a received packet preceding it are, e.g., 16 h 40 m and 16 h 52 m, respectively, then the packet monitor circuit 29 determines that the packets were received in the inverse sequence.

The operation of the packet monitor circuit 29 will be described more specifically with reference to FIGS. 14, (A) and (B). At the same time as the packet receiver 20 starts communication, the packet monitor circuit 29 starts operating. As shown in FIG. 14, (A) assume that the packet P4 is received just after the packet P2. Then, the sequence monitor 282 detects a sequence error ascribable to a packet loss and feeds the sequence error signal SE to the error packet generator 284. In response, the error packet generator 284 inputs an error packet D3 to the input buffer D3 at the time $t_3$. That is, the packet P2 is stored in the input buffer 22a at the time $t_2$, and the error packet D3 is stored over the packet P2. At the time $t_3$ therefore, the error packet D3 forms the tail of the queue, as shown in FIG. 14, (A).

The packet monitor circuit 29, preceding the input buffer 22a and monitoring packets at high speed, inputs the error packet D3 in the input buffer 22a before it receives the packet P4. The error packet D3 is input to the input buffer 22a without regard to the existing queue length. This is contrastive to the storage of the dummy frame DM of the previous embodiment in the input buffer 22a. Assume that the error packet D3 is not input to the input buffer 22a at the time $t_3$, and the packet P2 is read out later, making the input buffer 22a idle. Then, the idle buffer state occurs when the read request signal RR appears. The error packet D3 successfully obviates such an occurrence.

Subsequently, the packet monitor circuit 29 detects a packet loss at the time $t_5$ and then inputs the error packet D5 in the input buffer 22a at the time $t_6$. The packet P6 is delayed and fed before the time-out time, so that the error packet D6 is not generated or inserted due to the absence of the error signals TE and SE. The packet P6 does not arrive at the time $t_6$, but is stored in the input buffer 22a together with the next packet P7 at the time $t_7$. The packets P6 and P7 are therefore sequentially read out of the input buffer 22a in this order.

As shown in FIG. 14, (B), the error packets D3 and D5 inserted in place of the lost packets P3 and P5, respectively, complete a continuous train of speech data P1, P2, D3, P4, D5, P6 and P7. Consequently, despite packet losses and delays actually occurring, the speech data are reproduced with expected speech quality while causing the user to feel a minimum of skip or interruption.

For comparison, FIGS. 15, (A) and (B), demonstrate the reproduction of speech data.available with the embodiment of FIG. 2 under the occurrence of packet losses and packet delays. The embodiment of FIG. 2 lacks the packet monitor circuit 29. As shown in FIG. 15, (A), the error packet D3 is not input to the input buffer 22a between the times $t_3$ and $t_4$ with the result that the idle buffer state occurs when a read request appears. Consequently, as shown in FIG. 15, (B), a skip occurs between the packets P2 and P4. Moreover, because the packet P5 is lost, the speech is interrupted over the substantial interval between the times $t_5$ and $t_7$ due to the absence of data. For packets fed in the same conditions, this embodiment can reproduce more smooth speech data than the embodiment of FIG. 2 and can reduce the frequency of the idle buffer state. The packet monitor circuit 29 can, of course, be applied to the embodiment of FIG. 10.

As stated above, the illustrative embodiment reduces not only jitter, but also the influence of the skip and interruption of a speech ascribable to data losses and/or data delays, thereby providing the final speech output with optimal quality.

The embodiments shown and described each obviate the interruption and the skip of a speech ascribable to jitter and a packet loss, respectively, before an idle buffer state ascribable to a data delay, particularly a buffer idle state likely to occur when a read request is generated, occurs. For this purpose, the embodiments give accurate consideration to the jitter distribution of a communication network. The embodiments achieve this advantage without increasing the scale or the cost of a packet receiver.

Further, just after the power-up of the packet receiver or after the end of communication, dummy data are fed in consideration of a decode start point and stored in an input buffer beforehand. This successfully reduces the initial delay and provides the user of a packet receiver with serves while freeing the user from uneasiness. Moreover, the receipt of packets is monitored in order to feed error packets in place of abnormal received packets, so that the skip of a speech ascribable to data losses and the relatively long interruption of a speech are obviated.

In summary, it will be seen that the present invention provides a packet receiver capable of reducing the influence of the jitter of a communication network on speech quality. For this purpose, the packet receiver starts reading packets out of packet storing means when the length of a queue reaches a preselected threshold assigned to read-out. Further, the packet receiver of the present invention reduces the influence of delays of packets by executing discard processing with the queue every time the queue length reaches another threshold assigned to discarding.

The entire disclosure of Japanese patent application No. 2000-85744 filed Mar. 27, 2000 including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A packet receiver connected to a network for receiving communication packets sent from a packet transmitter and containing coded speech data via said network, decoding said communication packets, and outputting decoded speech data, said packet receiver comprising:
   a packet memory circuit for temporarily storing received packets including the communication packets in a first-in first-out fashion to thereby form a queue;
   a read start threshold setting circuit for setting, with respect to a length of the queue, a read start threshold at which the received packets should begin to be read out for decoding the received packets and outputting decoded speech data;
   a read comparing circuit for determining whether or not the length of the queue has reached said read start threshold, and outputting a read command signal in accordance with a result of a decision;
   a read control circuit for causing, in response to said read command signal, the received packets to be read out of said packet memory circuit, wherein by using a standard deviation of said coded speech data that reflects a jitter distribution of the network and causes a receipt time of the communication packet to vary, said read start point setting circuit sets the read start threshold at a length of the queue that is three times to four times as great as said standard deviation; and
   a diminishment control circuit for setting, with respect to the length of the queue, a discard start threshold and a discard end threshold at which the received packets should begin to be discarded and should stop being discarded, respectively, designating, when the length of said queue exceeds said discard start threshold, a received packet to be read out as a candidate to be discarded, and discarding said packet designated as a candidate,
   wherein said discard end threshold is set to a value between said discard start threshold and said read start threshold, and different than either of said discard start threshold and said read start threshold, if said discard start threshold is greater than said read start threshold.

2. A packet receiver connected to a network for receiving communication packets sent from a packet transmitter and containing coded speech data via said network, decoding said communication packets, and outputting decoded speech data, said packet receiver comprising:
   a packet memory circuit for temporarily storing received packets including the communication packets in a first-in first-out fashion to thereby form a queue;
   a read start threshold setting circuit for setting, with respect to a length of the queue, a read start threshold at which the received packets should begin to be read out for decoding the received packets and outputting decoded speech data;
   a read comparing circuit for determining whether or not the length of the queue has reached said read start threshold, and outputting a read command signal in accordance with a result of a decision;
   a read control circuit for causing, in response to said read command signal, the received packets to be read out of said packet memory circuit, by using a standard deviation of said coded speech data that reflects a jitter distribution of the network and causes a receipt time of the communication packet to vary, said read start point setting circuit setting the read start threshold at a length of the queue that is three to four times as great as said standard deviation; and
   a diminishment control circuit for setting, with respect to the length of the queue, a discard start threshold and a discard end threshold at which the received packets should begin to be discarded and should stop being discarded, respectively, designating, when the length of said queue exceeds said discard start threshold, a received packet to be read out as a candidate to be discarded, estimating, based on sound/soundless information contained in said packet designated, influence of said packet on quality of sound to be reproduced in an auditory aspect, and discarding or decoding said packet in accordance with a result of an estimation,
   wherein said discard end threshold is set to a value between said discard start threshold and said read start threshold, and different than either of said discard start threshold and said read start threshold, if said discard start threshold is greater than said read start threshold.

3. A packet receiver in accordance with claim 2, wherein said diminishment control circuit comprises:
   a switching decision circuit for generating, when the length of the queue exceeds said discard start threshold, a signal to said read control circuit for reading the packet designated out of said packet memory circuit as the candidate, estimating the influence of said packet on sound quality, and generating a switching signal for selecting either one of discard processing and decode processing;
   a switch for selecting the discard processing or the decode processing in accordance with said switching signal; and
   a discarding circuit for executing the discard processing to thereby discard the received packet input via said switch,
   wherein said switching decision circuit causes said switch to continuously select the discard processing up to said discharge end threshold set on the queue.

4. A packet receiver connected to a network for receiving communication packets sent from a packet transmitter and containing coded speech data via said network, decoding said communication packets, and outputting decoded speech data, said packet receiver comprising:
   a packet memory circuit for temporarily storing received packets including the communication packets in a first-in first-out fashion to thereby form a queue;
   a read start threshold setting circuit for setting, with respect to a length of the queue, a read start threshold at which the received packets should begin to be read out for decoding the received packets and outputting decoded speech data;
   a read comparing circuit for determining whether or not the length of the queue has reached said read start threshold, and outputting a read command signal in accordance with a result of a decision;
   a read control circuit for causing, in response to said read command signal, the received packets to be read out of said packet memory circuit, and a dummy memory circuit storing a dummy packet containing exclusive speech data; and
   a diminishment control circuit for setting, with respect to the length of the queue, a discard start threshold and a discard end threshold at which the received packets should begin to be discarded and should stop being discarded, respectively, designating, when the length of said queue exceeds said discard start threshold, a received packet to be read out as a candidate to be discarded, and discarding said packet designated as a candidate wherein before a new receipt of the communication packets, said dummy memory circuit feeds said dummy packet to said packet memory circuit, wherein by using a standard deviation of said coded speech data that reflects a jitter distribution of the network and causes a receipt time of the communication packet to vary, said read start threshold setting circuit sets the read start threshold at a length of the queue that is three times to four times grater as great as said standard deviation, and wherein said discard end threshold is set to a value between said discard start threshold and said read start threshold, and different than either of said discard start threshold and said read start threshold, if said discard start threshold is greater than said read start threshold.

5. A packet receiver in accordance with claim 4, wherein said diminishment control circuit serves to estimate, based on sound/soundless information contained in said packet designated, an influence of said packet on sound quality of sound to be reproduced in an auditory aspect.

6. A packet receiver in accordance with claim 5, wherein said diminishment control circuit comprises:
a switching decision circuit for generating, when the length of the queue exceeds said discard start threshold, a signal to said read control circuit for reading the packet designated out of said packet memory circuit as the candidate, estimating the influence of said packet on sound quality, and generating a switching signal for selecting either one of discard processing and decode processing;
a switch for selecting the discard processing or the decode processing in accordance with said switching signal; and
a discarding circuit for executing the discard processing to thereby discard the received packet input via said switch,
wherein said switching decision circuit causes said switch to continuously select the discard processing up to said discharge end threshold set on the queue.

7. A packet receiver in accordance with claim 6, further comprising a packet monitoring circuit for monitoring communication packets being sequentially received via the network and discarding, when any one of said communication packets exceeds a preselected allowable delay and/or is received in an inverse sequence, the one packet and/or feeding a preselected error packet to said packet memory circuit.

8. A packet receiver in accordance with claim 7, wherein said packet monitoring circuit comprises:
a time-out monitoring circuit for setting a particular receipt limit time representative of the preselected allowable delay to each communication packet, and determining whether or not each communication packet arrives before said receipt limit time assigned thereto expires;
a sequence monitoring circuit for monitoring a sequence of receipt of the communication packets on the basis of information contained in said communication packets;
a discarding circuit for monitoring the communication packets and discarding any one of said communication packets that has arrived after the receipt limit time assigned to thereto; and an error compensating circuit for feeding, when any one of the communication packets is discarded or received in an inverse sequence, the error packet to said packet memory circuit.

9. A method of receiving communication packets sent from a packet transmitter via a communication network and containing coded speech data via said network, decoding said communication packets, and outputting decoded speech data, said method comprising:
a first step of setting, before temporarily storing received packets including the communication packets to thereby form a queue, a read start threshold at which said received packets should begin to be read out for decoding the received packets and outputting decoded speech data, a discard start threshold at which said received packets should begin to be discarded, and a discard end threshold at which said received packets should end to be discarded with respect to a length of said queue, by using a standard deviation of said coded speech data that reflects a jitter distribution of the network and causes a receipt time of the communication packet to vary, the read start threshold being set at a length of the queue that is three to four times as great as said standard deviation;
a second step of temporarily storing the received packets to thereby form the queue;
a third step of comparing the queue with said read start threshold and outputting, in accordance with a result of a comparison, a read command signal for reading out the received packets;
a fourth step of reading out the received packets in response to said read command signal and either one of a read request signal requesting the received packets to be decoded and a discard candidate read command signal output when the queue reaches said discard start threshold;
a fifth step of selecting either one of discarding and decoding of the received packets read out;
a sixth step of discarding, when the discarding is selected, at least one of the received packets from a head of the queue while determining whether or not the length of the queue has reached said discard end threshold; and
a seventh step of decoding, when the decoding is selected, the received packet read out,
wherein said discard end threshold is set to a value between said discard start threshold and said read start threshold and different than either of said discard start threshold and said read start threshold, if said discard start threshold is greater than said read start threshold.

10. A method in accordance with claim 9, wherein said fifth step comprises designating, in response to said candidate read command signal, the received packet read out as a candidate to be discarded, and estimating, based on sound/soundless information contained in said packet designated, an influence of said packet on sound quality of sound to be reproduced in an auditory aspect, and discarding or decoding said packet in accordance with a result of an estimation.

11. A method in accordance with claim 9, wherein before receipt of a new communication packet, a dummy packet containing exclusive speech data is fed and stored.

12. A method in accordance with claim 9, further comprising an eighth step of, when any one of communication packets sequentially received via the network and monitored exceeds a preselected allowable delay or is received in an inverse sequence, at least one of discarding the one communication packet and feeding a preselected error packet.

13. A method in accordance with claim 12, wherein said eighth step comprises:
- a step of assigning a particular receipt limit time representative of the preselected allowable delay to each communication packet, and determining whether or not each communication packet arrives before said receipt limit time assigned thereto expires;
- a step of monitoring a sequence of receipt of the communication packets on the basis of information contained in said communication packets;
- a step of monitoring the communication packets and discarding any one of said communication packets that has arrived after the receipt limit time assigned to thereto; and
- a step of feeding, when any one of the communication packets is discarded or received in an inverse sequence, the error packet.

* * * * *